(12) United States Patent
Shiina et al.

(10) Patent No.: US 8,926,329 B2
(45) Date of Patent: Jan. 6, 2015

(54) SIGN LANGUAGE ACTION GENERATING DEVICE AND COMMUNICATION ROBOT

(71) Applicant: Honda Motor Co., Ltd., Tokyo (JP)

(72) Inventors: Asuka Shiina, Saitama (JP); Yuji Nagashima, Hachioji (JP)

(73) Assignee: Honda Motor Co., Ltd., Tokyo (JP)

( * ) Notice: Subject to any disclaimer, the term of this patent is extended or adjusted under 35 U.S.C. 154(b) by 159 days.

(21) Appl. No.: 13/668,679

(22) Filed: Nov. 5, 2012

(65) Prior Publication Data

US 2013/0115578 A1     May 9, 2013

(30) Foreign Application Priority Data

Nov. 4, 2011    (JP) .................. 2011-242895

(51) Int. Cl.
    *G09B 21/00*     (2006.01)

(52) U.S. Cl.
    CPC .................... *G09B 21/009* (2013.01)
    USPC ........................................................ 434/112

(58) Field of Classification Search
    USPC ........................................................ 434/112
    See application file for complete search history.

(56) References Cited

U.S. PATENT DOCUMENTS

| | | | |
|---|---|---|---|
| 6,681,031 B2 * | 1/2004 | Cohen et al. | 382/103 |
| 7,308,112 B2 * | 12/2007 | Fujimura et al. | 382/103 |
| 7,379,563 B2 * | 5/2008 | Shamaie | 382/103 |
| 7,620,202 B2 * | 11/2009 | Fujimura et al. | 382/103 |
| 8,005,263 B2 * | 8/2011 | Fujimura et al. | 382/103 |
| 8,493,174 B2 * | 7/2013 | Agrawal | 340/4.1 |
| 2001/0047226 A1 * | 11/2001 | Saijo et al. | 700/261 |
| 2002/0181773 A1 * | 12/2002 | Higaki et al. | 382/190 |
| 2007/0135962 A1 * | 6/2007 | Kawabe et al. | 700/225 |
| 2009/0274339 A9 * | 11/2009 | Cohen et al. | 382/103 |
| 2011/0142353 A1 * | 6/2011 | Hoshino et al. | 382/203 |
| 2012/0197438 A1 | 8/2012 | Ogami | |
| 2013/0204435 A1 * | 8/2013 | Moon et al. | 700/258 |

FOREIGN PATENT DOCUMENTS

| | | |
|---|---|---|
| JP | 06-186905 | 7/1994 |
| JP | 2011-115877 | 6/2011 |

* cited by examiner

*Primary Examiner* — Robert J Utama
(74) *Attorney, Agent, or Firm* — Rankin, Hill & Clark LLP

(57) ABSTRACT

A sign language action generating device includes: a word string input unit; a trace creation unit that extracts a sign language action data for each word of a pair of words inputted as a word string and creates a trace between an end point position of a sign language action having the same meaning as a prior word of the pair of words and a start point position thereof having the same meaning as a posterior word; an interference determination unit that determines whether or not interference is generated between parts of a robot on each trace; an action connection unit that connects sign language actions; and an action adjustment unit that adjusts a position coordinate or a velocity of the pair of words within a prescribed threshold of a shift amount or an evaluation function within which meanings of the prior word and the posterior word can be maintained.

16 Claims, 11 Drawing Sheets

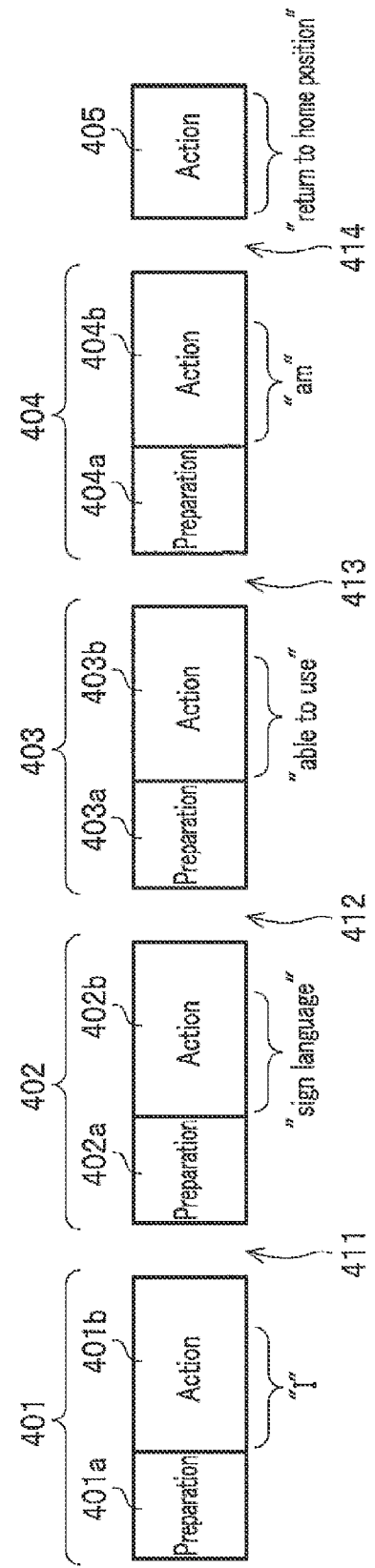

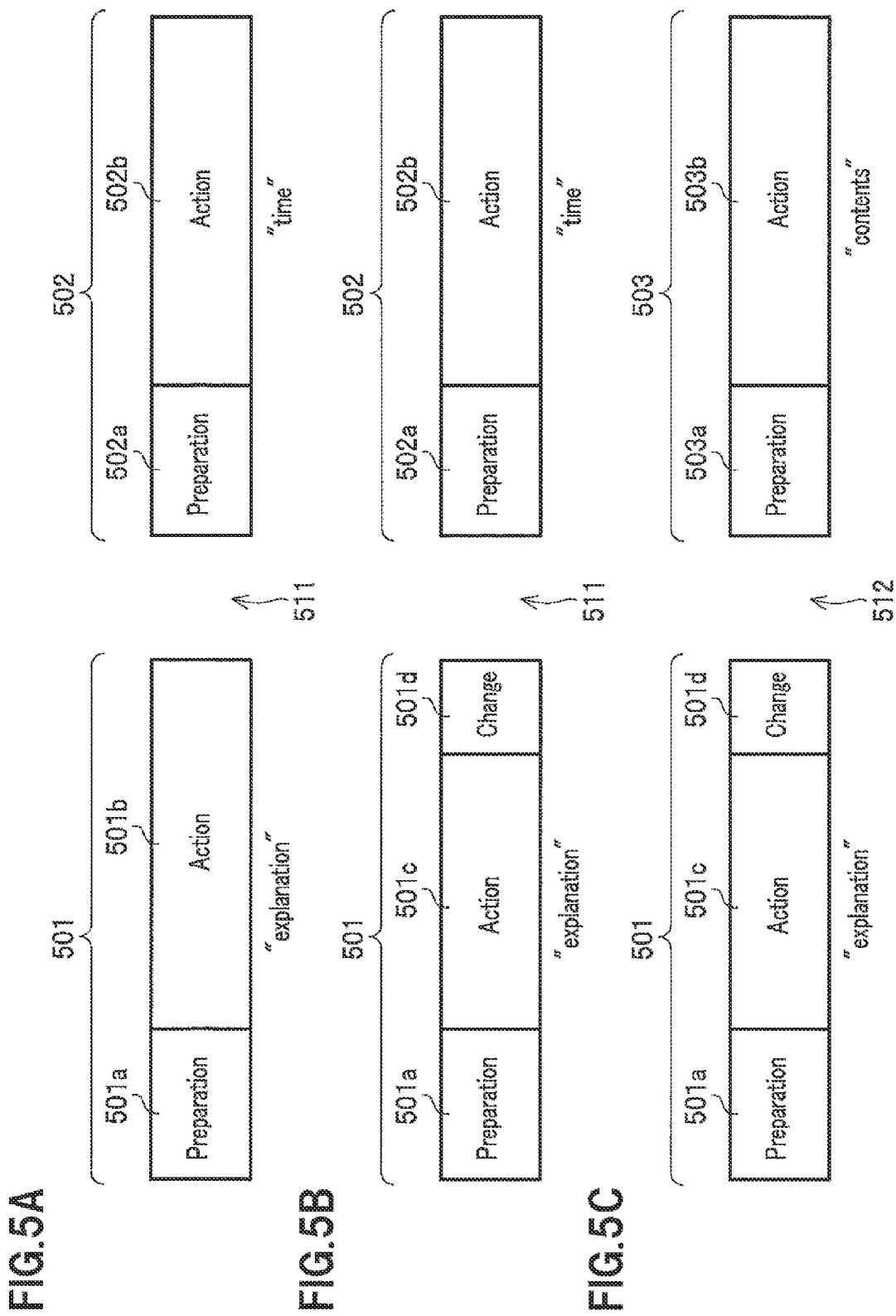

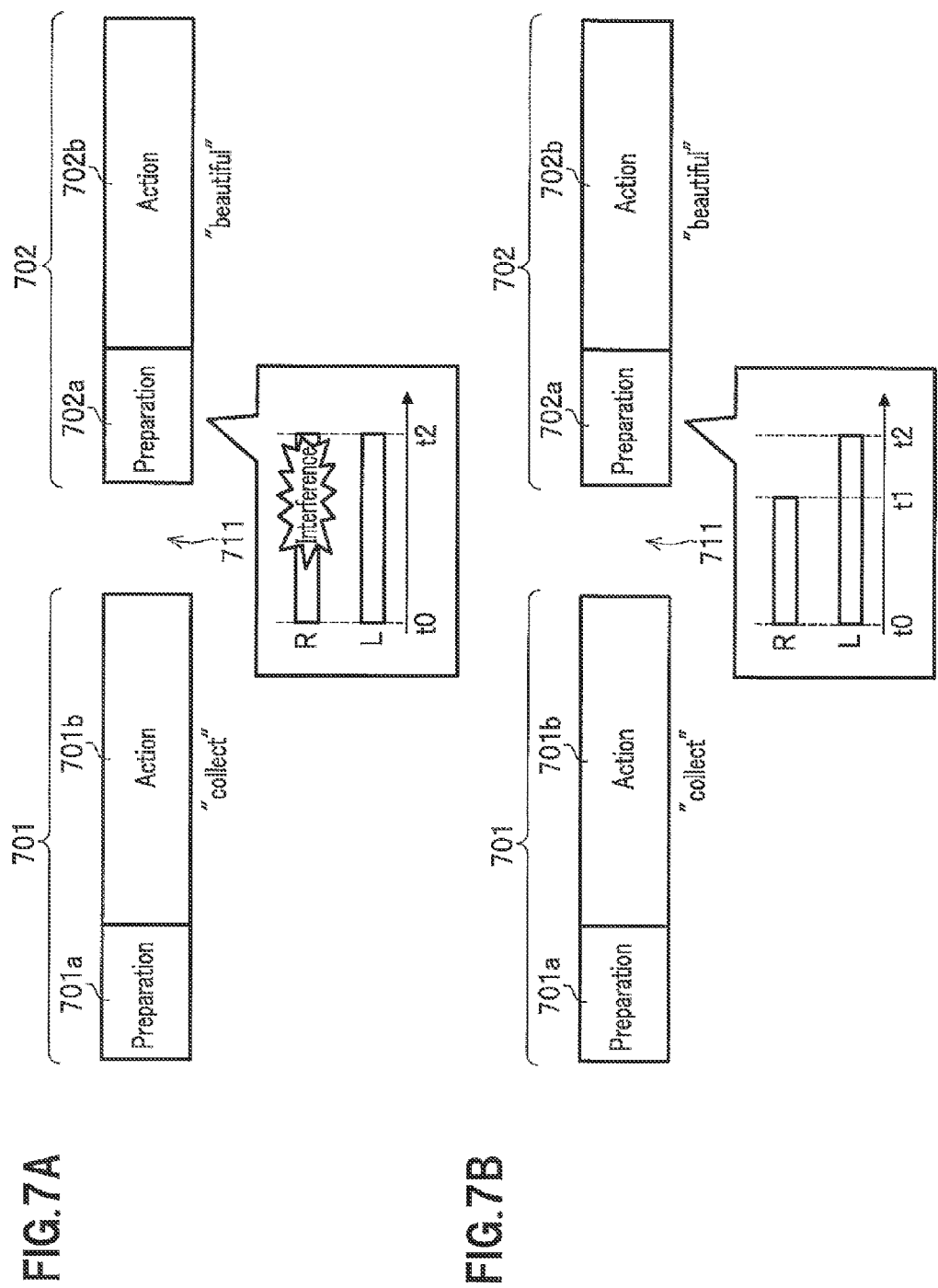

SIGN LANGUAGE ACTION GENERATING DEVICE AND COMMUNICATION ROBOT

CROSS REFERENCE TO RELATED APPLICATIONS

This application claims the benefit of Japanese Patent Application No. 2011-242895 filed on Nov. 4, 2011, the disclosure of which is incorporated herein by reference.

BACKGROUND OF THE INVENTION

1. Field of the Invention

The present invention relates to a technique of performing sign language by a robot, and more specifically, to a sign language action generating device which generates a sign language action generated by connecting each sign language action corresponding to a word used in a sign language by a robot, and a communication robot equipped with the sign language action generating device.

2. Description of the Related Art

Japan Patent Publication No. 3235622 discloses a technique of performing sign language by a communication robot with an intention to have communication with a human. However, the communication robot described in Japan Patent Publication No. 3235622 is not a real robot but an animated robot displayed on a screen. Thus, Japan Patent Publication No. 3235622 does not disclose generation of an arm trace produced by both arms of a robot or generation of an action such as, for example, a rotation of an arm thereof about an axis, which are necessary for a rotation of a real arm to perform sign language. If an arm of a real robot bumps against other member or the like, some parts of the robot may get deteriorated or break down. Hereinafter, an undesirable state of an arm in which the arm comes in contact with or collides against other member, or becomes an obstacle of other member even without any contact therewith is collectively referred to as an interference.

Various techniques for avoiding interference of an arm of a robot have been known in a field of industrial robots. A number of techniques for generating a trace of an arm of various robots operated in a workplace such as a factory have been disclosed (see, for example, Japanese Laid-Open Patent Application, Publication No. 2011-115877. The technique for generating a trace of an arm of such a robot assumes, however, that the robot is operated based on a positional relationship between a work and a holding part (a hand) at an end of the arm.

SUMMARY OF THE INVENTION

The technique for generating a trace of an arm of a working robot assumes that the robot performs an operation based on a positional relationship between a hand thereof and a work. If such a robot as it is performs sign language, the technique may generate a sign language having a meaning different from what should be actually conveyed. This is because, in sign language, different meanings are carried depending on in which direction the robot turns a hand thereof or which posture the robot takes. A robot in creating a trace for sign language cannot make every possible change in the trace just because no interference of the arm is generated.

It is relatively easy to determine an action of a single word translated into sign language (a sign language word). Usually, however, plural words are necessary to represent what someone wants to express in sign language. If one sign language word is simply linked to another sign language word via a trace called a "glide" and interference of an arm is then generated, it is difficult to carry out a sign language action expressed by a combination of the two sign language words. Thus, there is a problem that expression in sign language by a robot becomes limited.

The present invention has been made in an attempt to solve the aforementioned problems and to provide: a sign language action generating device capable of increasing combinations of words which are adoptable as sign language performed by a robot; and a communication robot.

A sign language action generating device of the present invention creates a sign language action for each word string by connecting sign language actions for each word used in a sign language performed by a robot. The robot includes, as parts thereof, a body, a head, two arms, two legs, and a controller, each of the latter four parts are connected to the body. The sign language action generating device includes: a storage unit that stores therein a sign language word database in which a sign language action data which is previously created such that, in units of words, no interference is generated between the parts of the robot used for performing a sign language, the sign language action data being stored in association with a word having the same meaning as a sign language action corresponding thereto; a word string input unit into which a word string is inputted; a trace creation unit that extracts, from the sign language word database, a data on a sign language action for each pair of words which is constituted by two successive words in the word string inputted into the word string input unit, and creates, for the each pair of words, a trace which connects between an end point position of a sign language action having the same meaning as a prior word of the pair of words and a start point position of a sign language action having the same meaning as a posterior word thereof, based on the extracted sign language action data; an interference determination unit that determines that interference is generated between the parts of the robot used when the robot performs a sign language, if a distance between the parts on each of the created traces is not within a prescribed allowable range; an action connection unit that connects sign language actions for words via the traces created in accordance with the inputted word strings such that no interference is generated between the parts of the robot; and an action adjustment unit that, if the interference is determined to be generated between any of the parts of the robot on the trace created for a pair of words, adjusts a position coordinate or a velocity for the pair of words as a sign language action so as to keep the position coordinate or the velocity within an allowable range as well as within a prescribed threshold range which is previously set such that meanings of both the prior word and the posterior word of the pair of words as the sign language action can be maintained.

With this configuration, the sign language action generating device sequentially determines whether or not interference is generated between the parts which the robot uses for performing a sign language, on a trace generated for each pair of words which is constituted by two successive words in the inputted word string. The sign language action generating device generates a sign language action for each word string by connecting sign language actions for words via the created traces such that no interference is generated between the parts of the robot. If interference is determined to be generated, the sign language action generating device adjusts a position coordinate or a velocity as a sign language action for the pair of words such that the position coordinate or the velocity for the pair of words as the sign language action r is kept within an allowable range while preventing interference and also such that meanings of the words in the pair of words can be maintained.

In the sign language action generating device of the present invention, preferably but not necessarily, the action adjustment unit adjusts a position coordinate or a velocity using, as the prescribed threshold range, a threshold range of a shift amount of a prescribed position coordinate or a prescribed velocity, or a threshold range of an evaluation function calculated based on the shift amount.

In the sign language action generating device of the present invention, preferably but not necessarily, the action adjustment unit includes an end point coordinate setting unit that, if interference is generated in the pair of words, adjusts a shift amount of a position coordinate of an end point of a sign language action having the same meaning as the prior word of the pair of words, or an evaluation function calculated based on the shift amount, within a prescribed threshold range.

With this configuration, if interference is generated in the pair of words, the sign language action generating device can prevent interference from occurring by shifting a position coordinate of an endpoint of a sign language action having the same meaning as the prior word of the pair of words. This means that a person who sees the sign language action corresponding to the prior word recognizes the meaning of the prior word little by little as the sign language action comes closer from the start point toward the end point, Thus, even if the endpoint is slightly shifted, it is less possible that the meaning of the prior word represented by the sign language action is misunderstood. Further, because no change is made to an action for the posterior word, the meanings of both the prior word and the posterior word can be maintained.

In the sign language action generating device of the present invention, preferably but not necessarily, the action adjustment unit further includes a via point setting unit that, if the interference is still generated in the pair of words in spite of the shift of the position coordinate of the end point by the end point coordinate setting unit, cancels the shift of the position coordinate of the end point, defaults the position coordinate, and adjusts a shift amount of a position coordinate of a via point which is intervened between an end point of the prior word and a start point of the posterior word of the pair of words, or an evaluation function calculated based on the shift amount, within a prescribed threshold range.

With this configuration, if interference is generated in the pair of words, the sign language action generating device adjusts a trace at a glide for connecting words in the pair of words, thus allowing no interference to be generated any Further, because no change is made to sign language actions corresponding to the words in the pair of words, it is less possible for a person who sees the sign language actions to misunderstand the meanings of the prior word and the posterior word.

In the sign language action generating device of the present invention, preferably but not necessarily, the action adjustment unit further includes a timing change unit that, if the interference is still generated in the pair of words in spite of the shift of the position coordinate of the via point by the via point setting unit, cancels the shift of the position coordinate of the via point, defaults the position coordinate, and adjusts a shift amount of a velocity of a sign language action having the same meaning as the posterior word of the pair of words, or an evaluation function calculated based on the shift amount, within a prescribed threshold range.

With this configuration, if interference is generated in the pair of words, the sign language action generating device changes a velocity of a sign language action having the same meaning as the posterior word of the pair of words, thus allowing no interference to be generated any more. Herein, no change is made to a direction in which the robot turns a hand thereof or which shape the hand makes, between a start point and an end point of the sign language corresponding to the posterior word. Thus, it is less possible for a person who sees the sign language action for the posterior word to misunderstand the meaning of the posterior word. Further, because no change is made to a sign language action corresponding to the prior word, the meanings of both the prior word and the posterior word can be maintained.

In the sign language action generating device of the present invention, preferably but not necessarily, the end point coordinate setting unit shifts the position coordinate of the end point of the sign language action having the same meaning as the prior word of the pair of words, such that a calculation result with respect to the prior word using a prescribed evaluation function regarding to which degree a word in a sign language action can be understood falls within a prescribed range within which the meaning of the prior word of the pair of words can be maintained.

In the sign language action generating device of the present invention, preferably but not necessarily, the via point setting unit shifts the position coordinate of the via point, such that a calculation result with respect to the pair of words using a prescribed evaluation function regarding to which degree a word in a sign language action can be understood falls within a prescribed range in which the meanings of the prior word and the posterior word of the pair of words can be maintained.

In the sign language action generating device of the present invention, preferably but not necessarily, the timing change unit changes the velocity of the sign language action having the same meaning as the posterior word of the pair of words, such that a calculation result with respect to the posterior word using a prescribed evaluation function regarding to which degree a word in a sign language action can be understood falls within a prescribed range within which the meaning of the posterior word of the pair of words can be maintained.

With this configuration, if interference is generated in the pair of words, the sign language action generating device can prevent interference from occurring such that the meaning of the prior word, the posterior word, or the both can be maintained, using a prescribed evaluation function regarding to which degree a word in a sign language action can be understood. Thus, by previously setting such an evaluation function, a clear standard can be set in determining whether or not a given combination of words is suitable to be used as a sign language performed by a robot.

A communication robot of the present invention includes, as parts thereof: a body; a head; two arms; two legs; and a controller, each of the latter four parts being connected to the body. The controller includes: the sign language action generating device; an action determination unit that determines a sign language action to be expressed and inputs a word string representing the determined sign language action, into the sign language action generating device; and an action execution unit that executes the sign language action having the same meaning as the inputted word string, based on the sign language action for each word string generated by the sign language action generating device.

With this configuration, the communication robot is equipped with the sign language action generating device and is operated based on a sign language action for each word string created such that an interference of an arm is prevented and also such that a meaning of the sign language action can be understood. Thus, the robot can perform an appropriate sign language action without causing interference.

In the present invention, combinations of words which are adoptable as sign language performed by a robot can be increased. The sign language action generating device of the present invention enables generation of a large number of series of general-purpose sign language actions corresponding to word strings. Thus, the communication robot of the present invention can conduct smooth communication by performing a number of sign language actions.

BRIEF DESCRIPTION OF THE DRAWINGS

FIG. 4 is a conceptual diagram of a word data of sign language words arranged by a trace creation unit of the sign language action generating device of FIG. 1 according to the embodiment.

FIGS. 5A, 5B, and 5C are each a conceptual diagram illustrating an end point coordinate which is set to a word data of a prior word by an end point coordinate setting unit of the sign language action generating device of FIG. 1, according to the embodiment. FIG. 5A illustrates word data of a pair of words arranged before the end point coordinate is set. FIG. 5B illustrates the word data of the pair of words arranged after the end point coordinate is set. FIG. 5C illustrates the word data of the pair of words arranged after the end point coordinate is set, with a posterior word of the pair of words replaced by another.

FIG. 6A illustrates word data of a pair of words arranged before the via point is set. FIG. 6B illustrates the word data of the pair of words arranged after the via point is set.

FIGS. 7A and 7B are each a conceptual diagram illustrating an action velocity which is set to word data of a posterior word by a timing change unit of the sign language action generating device of FIG. 1, according to the embodiment. FIG. 7A illustrates word data of a pair of words arranged before the action velocity is set. FIG. 7B illustrates the word data of the pair of words arranged after the action velocity is set.

DETAILED DESCRIPTION OF THE EXEMPLARY EMBODIMENT

An embodiment for carrying out a sign language action generating device and a communication robot of the present invention is described in detail with reference to related drawings. In the following explanation, a case is described as an example in which the communication robot is equipped with the sign language action generating device.

[1. Robot System]

Figure 1:
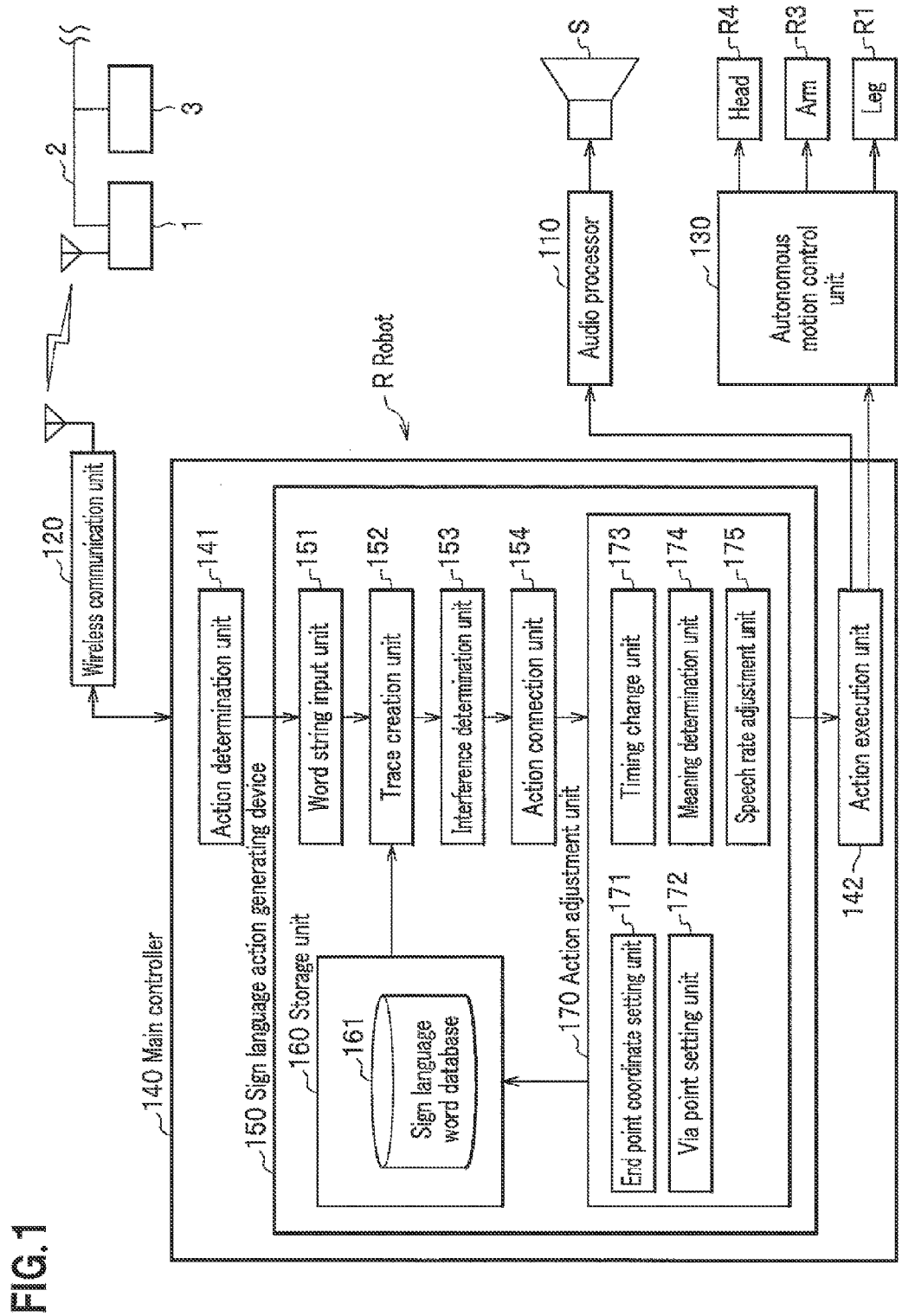
FIG. 1 is a block diagram schematically illustrating a structure of a robot including a sign language action generating device according to an embodiment of the present invention.

As shown in FIG. 1, a robot system including the communication robot (which is simply referred to as a robot R hereinafter) includes: the robot R; a wireless base station 1 that is wirelessly connected to the robot R; and a management computer 3 that is connected to the wireless base station 1 via the robot-dedicated network 2.

The management computer 3 controls the robot R, more specifically, provides various controls on the robot R with respect to movements or speech thereof via the wireless base station 1 and the robot-dedicated network 2, and also provides the robot R with necessary information. The necessary information herein includes, for example, a map of an area where the robot R is present, speech data, and sign language action data and is stored in a storage unit provided in the management computer 3. The robot-dedicated network 2 connects the wireless base station 1, the management computer 3, and an external network not shown, and is embodied by a LAN or the like. A terminal not shown is connected to the external network and can register information in the management computer 3 or change contents of the registered information.

[2. Outline of Structure of Robot]

Figure 2:
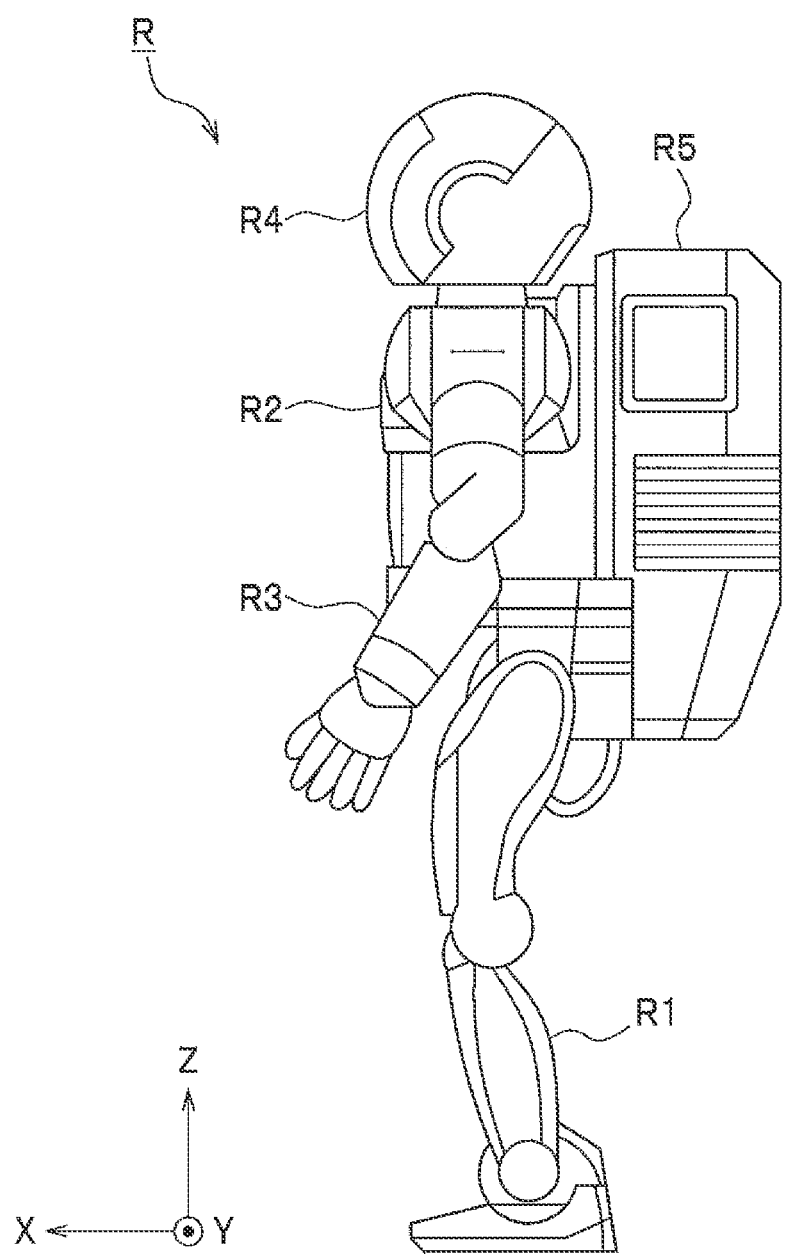
FIG. 2 is a lateral view schematically illustrating an appearance of the robot according to the embodiment.

FIG. 1 is a block diagram schematically illustrating a structure of the robot R according to the embodiment of the present invention. FIG. 2 is a lateral view schematically illustrating an appearance of the robot R. Description herein is made, as an example, assuming that the robot R is a bipedal walking type autonomous mobile robot and can perform sign language actions. The robot R executes a sign language action as a task according to an execution instruction inputted from the management computer 3.

As shown in FIG. 2, the robot R includes, as parts thereof, each leg R1, a body R2, each arm R3, a head R4, and a controller housing unit R5. Each of the leg R1, the arm R3, and the head R4 is connected to the body R2 and is driven by respective actuators. An autonomous motion control unit 130 (see FIG. 1) controls bipedal walking of the robot R.

In addition to the leg R1, the body R2, the arm R3, the head R4, and the controller housing unit R5, the robot R includes, for example, as shown in FIG. 1, an audio processor 110, a wireless communication unit 120, the autonomous motion control unit 130, and a main controller (which may also be referred to as a controller) 140, which are disposed at respective appropriate positions in the R1-R5.

The audio processor 110 outputs a voice sound to a speaker S based on an instruction for a speech from the main controller 140 or generates character information (text data) based on a voice sound data inputted from a microphone not shown and outputs the character information to the main controller 140. The head R4 includes therein a camera. An image processor not shown processes an image captured by the camera, thus allowing the robot R to recognize an obstacle or a human therearound.

The wireless communication unit 120 is a communicating device which transmits and receives data to and from the management computer 3. The wireless communication unit 120 selects and uses, for example, a public network such as a mobile phone network and a PHS (Personal Handyphone System) network, or a short distance wireless communication such as a wireless LAN complying with IEEE 802.11b.

The autonomous motion control unit 130 drives the leg R1, the body R2, the arm R3, and the head R4 according to an instruction from the main controller 140. The autonomous motion control unit 130 includes, though not shown: a leg control unit that drives a hip joint, a knee joint and an ankle joint of the leg R1; an arm control unit that drives a shoulder joint, an elbow joint, and a wrist joint of the arm R3; a hand control unit that drives finger joints of a hand of the arm. R3; a waist control unit that rotationally drives the body R2 relative to the arm R3 in a horizontal direction; and a neck control unit that drives a neck joint of the head R4. The leg control unit, the arm control unit, the hand control unit, the waist control unit, and the neck control unit output respective driving signals to the appropriate actuators which drive the head R1, the arms R2, the legs R3 and the body R4.

The main controller 140 controls the audio processor 110, the wireless communication unit 120, and the autonomous motion control unit 130, more specifically, makes various determinations and generates instructions for actions by respective parts. In addition to the sign language action generating device 150, the main controller 40 includes, though not shown, a number of functional modules in each of which functions for executing various tasks of the robot R are modularized. The functional modules can provide various controls such as, for example, a control for communicating with the management computer 3; a control for executing a prescribed task based on a task execution instruction acquired from the management computer 3; and a control for moving the robot R to a destination.

In this embodiment, the main controller 140 includes the sign language action generating device 150, and the sign language action generating device 150 includes a storage unit 160. Details of the sign language action generating device 150 and the storage unit 160 will be described hereinafter. Note that, in addition to the storage unit 160, robot R includes a main storage part not shown constituted by, for example, a generally-available hard disk or the like. The main storage part stores therein information (such as a local map data and data for a speech) transmitted from the management computer 3 and also stores therein information necessary for the main controller 140 to perform various operations.

[3. Appearance of Robot]

Next is described an appearance of the robot R according to the embodiment of the present invention. In the description below, let a front-back direction of the robot R be an x-axis; a left-right direction, a y-axis; and an up-down direction, a z-axis (see FIG. 2). As shown in FIG. 2, the robot R stands up and moves (walks, runs, or the like) on a pair of legs R1 (only one leg is shown) just like a human does. The robot R includes the body R2, a pair of arms R2 (only one arm is shown), and the head R4, and moves autonomously. The robot R also includes the controller housing unit R5 which controls actions of the legs R1, the body R2, the arms R3, and the head R4, in a manner that the robot R carries the parts R1 to R4 on its shoulder (at the back of the body R2).

[4. Driving Structure of Robot]

Figure 3:
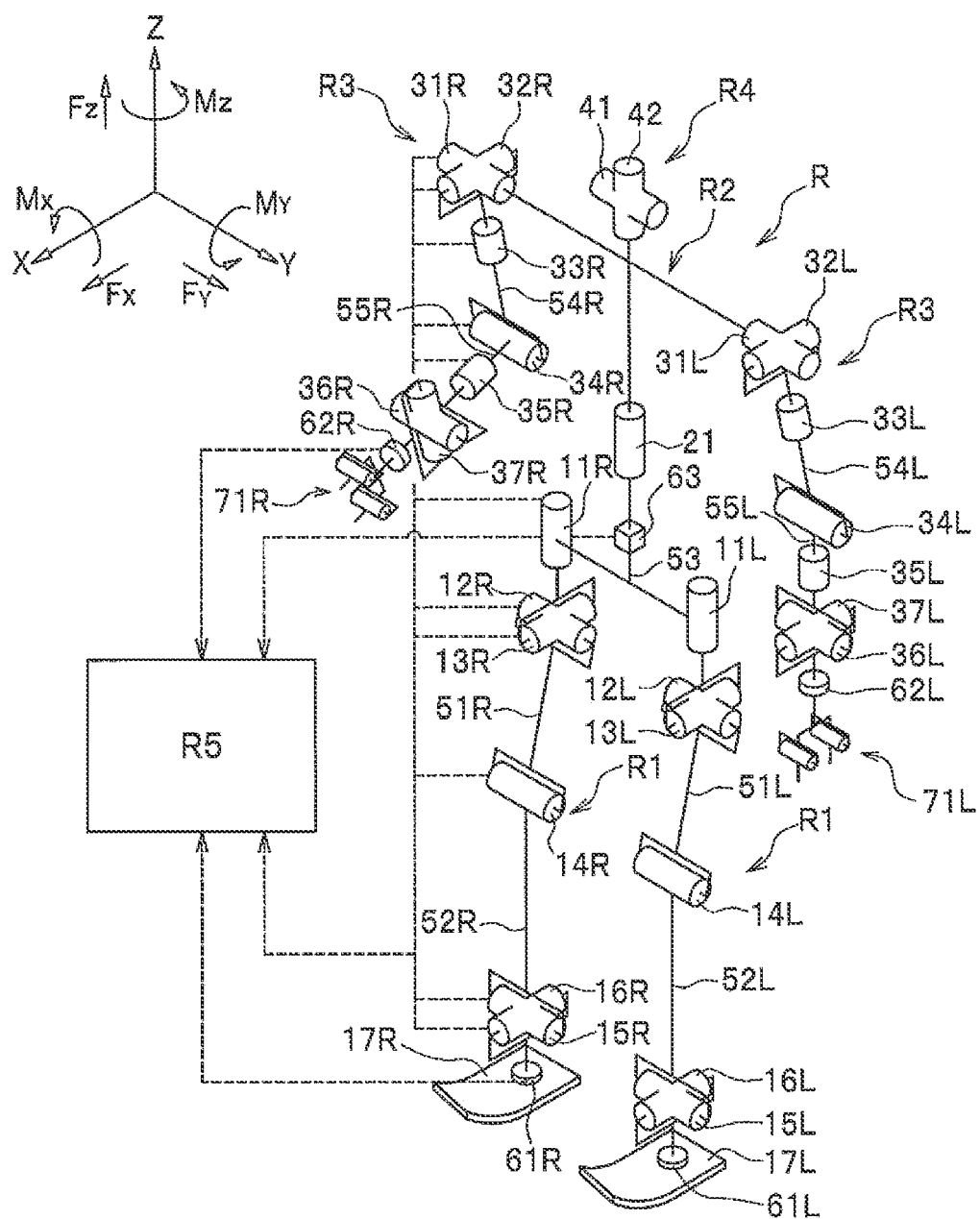
FIG. 3 is a perspective diagram schematically illustrating a driving structure of the robot of FIG. 2 according to the embodiment.

Next is described a driving structure of the robot R with reference to FIG. 3. In FIG. 3, a joint is illustrated in form of an electric motor that actually drives the joint.

<Leg R1>

As shown in FIG. 3, each of the right and left legs R1 includes six joints 11R(L) to 16R(L). (R represents right and L represents left hereinafter. R or L may not be added to a reference numeral.) The twelve joints in total of the right and left legs are: hip joints 11R, 11L for turning the leg (about the z-axis) at a crotch (a joint part between the leg R1 and the body R2); hip joints 12R, 12L at the crotch about a pitch axis (the y-axis); hip joints 13R, 13L at the crotch about a roll axis (the x-axis); knee joints 14R, 14L each at a knee about a pitch axis (the y-axis); ankle joints each at an ankle about a pitch axis (the y-axis); and ankle joints 16R, 16L each at the ankle about a roll axis (the x-axis). Feet 17R, 17L are fixed under each of the legs R1.

In sum, the leg R1 includes the hip joints 11R(L), 12R(L), and 13R(L), the knee joint 14R(L), and the ankle joints 15R (L) and 16R(L). The hip joints 11R(L) to 13R(L) and the knee joint 14R(L) are connected by thigh links 51R(L). The knee joint 14R(L) and the ankle joints 15R(L) and 16R(L) are connected by lower thigh links 52R(L).

<Body R2>

As shown in FIG. 3, the body R2 is a main part of the robot R and is connected to the leg R1, the arm R3, and the head R4. That is, the body R2 (an upper body link 53) is connected to the leg R1 via the hip joints 11R(L) to 13R(L). The body R2 is connected to the arm R3 via shoulder joints 31R(L) to 33R(L) to be described hereinafter. The body R2 is connected to the head R4 via neck joints 41, 42 to be described hereinafter. The body R2 also includes a waist joint 21 for rotating the upper body (about the z-axis).

<Arm R2>

As shown in FIG. 3, each of the right and left arms R2 includes seven joints 31R(L) to 37R(L). The fourteen joints in total of the right and left shoulders are: shoulder joints 31R, 31L at a shoulder (a joint part between the arm. R3 and the body R2) about a pitch axis (the y-axis); shoulder joints 32R, 32L at the shoulder about a roll axis (the x-axis); shoulder joints 33R, 33L for rotating the arm R3 (about the z-axis); elbow joints 34R, 34L at an elbow about the pitch axis (the y-axis); arm joints 35R, 35L for rotating a wrist (about the z-axis); wrist joints 36R, 36L at the wrist about the pitch axis (the y-axis); and wrist joints 37R, 37L at the wrist about the roll axis (the x-axis). Holding parts (hands) 71R, 71L are attached to an end of the arm R3.

In sum, the arm R3 includes the shoulder joints 31R(L), 32R(L), 33R(L), the elbow joint 34R(L), the arm joint 35R (L), and the wrist joints 36R(L) and 37R(L). The shoulder joints 31R(L) to 33R(L) and the elbow joint 34R(L) are connected by an upper arm link 54R(L). The elbow joint 34R(L) and the wrist joints 36R (L), 37R (L) are connected by a forearm link 55R (L).

<Head R4>

As shown in FIG. 3, the head R4 includes: a neck joint 41 at a neck (a joint part between the head R4 and the body R2) about the y-axis; a neck joint 42 at the neck about the z-axis. The neck joint 41 is provided for use in setting a tilt angle of the head R4. The neck joint 42 is provided for use in setting a pan angle of the head R4.

The configuration described above gives 12 degrees of freedom in total to a pair of the legs R1. Twelve joints 11R (L) to 16R (L) are driven at appropriate degrees while the robot R is moving, to thereby give the leg R1 a desired movement. This allows the robot R to arbitrarily move around in a three-dimensional space. The configuration described above also gives 14 degrees of freedom in total to a pair of the arms R2. The 14 joints 31R (L) to 37R (L) are driven at appropriate degrees. This allows the robot R to perform a desired operation.

A well-known six-axis force sensor 61R (L) is disposed between the ankle joints 15R (L), 16R (L) and the foot 17R (L). The six-axis force sensor 61R (L) detects three direction components Fx, Fy, Fz of floor reaction force which acts on the robot R from a floor surface and three direction components Mx, My, Mz of moment.

Another well-known six-axis force sensor (which may also be referred to as a movement detection means) 62R (L) is disposed between the wrist joints 36R (L), 37R (L) and the holding part 71R (L). The six-axis force sensor 62R (L)

detects three direction components Fx, Fy, Fz of reaction force which acts on the holding part 71R (L) of the robot R and three direction components Mx, My, Mz of moment.

An inclination sensor 63 is disposed at the body R2. The inclination sensor 63 detects an inclination of the body R2 with respect to a gravity axis (the z-axis), and an angular velocity thereof. Respective electric motors of the joints relatively displace the thigh link 51R (L), the lower thigh link 52R (L), or the like via reducers (not shown) which reduce or increase power of the electric motors. An angle of each of the joints is detected by a joint angle detection means (for example, a rotary encoder).

The controller housing unit R5 houses therein the wireless communication unit 120, the autonomous motion control unit 130, the main controller 140, a battery (not shown), or the like. Data detected by the sensors 61 to 63 or the like is transmitted to the control units in the controller housing unit R5. The electric motors are driven by driving instruction signals from the control units.

[5. Configuration of Main Controller]

The main controller 140 includes, for example, a CPU (Central Processing Unit), a ROM (Read Only Memory), a RAM (Random Access Memory), a HDD (Hard Disk Drive), an input/output interface, and the like.

In this embodiment, the main controller 140 includes, as a configuration focusing on sign language by the robot R, an action determination unit 141, an action execution unit 142, and a sign language action generating device 150, as shown in FIG. 1.

The action determination unit 141 determines a sign language action expressed by the robot R and inputs a word string represented by the determined sign language action, into the sign language action generating device 150.

This embodiment is configured to generate data for performing a sign language action before the robot R actually performs the sign language action, instead of generating the data in parallel with the execution of the sign language action by the robot R. Thus, at a time when a data on the sign language action is generated or earlier than that, the action determination unit 141 acquires a sign language translation (a word string) which is previously determined so as to express the sign language action from, for example, the wireless base station 1 via the wireless communication unit 120. The action determination unit 141 then stores the sign language translation in a main storage unit not shown.

In this embodiment, the action determination unit 141 instructs the sign language action generating device 150 to generate a sign language action based on the previously-stored sign language translation (a word string), when the action determination unit 141 receives a command to instruct a sign language action creation task for generating a sign language action, from outside, or on a prescribed schedule for executing the sign language action creation task.

In carrying out the sign language action, the action determination unit 141 notifies the sign language action generating device 150 of the determined sign language translation (word string), to thereby instruct the action execution unit 142 to output a data on a previously-generated sign language action from the sign language translation, when the action determination unit 141 receives a command to instruct a sign language action task for executing a sign language action, from outside, or on a prescribed schedule for executing the sign language action task.

The action execution unit 142 executes the sign language action representing the word string determined and inputted by the action determination unit 141, based on the sign language action for each word string generated by the sign language action generating device 150.

The action execution unit 142 outputs a data on a joint angle, a target position, or the like, as a word data corresponding to each sign language action, to the autonomous motion control unit 130 and instructs the autonomous motion control unit 130 to carry out the sign language action. The autonomous motion control unit 130 interprets the data on a joint angle or the like of the sign language action and generates a motor driving signal so as to power an electric motor of a drive unit (an actuator) for driving the arm R3 or the like. This makes the robot R execute the sign language action.

In a case where the robot R carries out a sign language action simultaneously with a speech having the same meaning of the sign language action, when the action execution unit 142 outputs a word data or the like corresponding to the sign language action to the autonomous motion control unit 130, the action execution unit 142 outputs an instruction signal to synchronize the sign language action and a voice sound of the speech to the audio processor 110.

[6. Sign Language Action Generating Device]

The sign language action generating device 150 generates a sign language action for each word string by sequentially arranging sign language actions for each word used in a sign language by the robot R. The sign language action generating device 150 includes, as major components, a word string input unit 151, a trace creation unit 152, an interference determination unit 153, an action connection unit 154, a storage unit 160, and an action adjustment unit 170, as shown in FIG. 1.

The word string input unit 151 is a unit into which a word string is inputted. Word strings are previously arranged in form of a sentence expressing contents of information which is to be provided to outside for communication. In this embodiment, the word string input unit 151 reads out a sign language translation (word string) from the main storage part not shown and outputs the sign language translation to the trace creation unit 152, when the word string input unit 151 receives an instruction to create a sign language sentence based on a previously-stored sign language translation (word string), from the action determination unit 141.

The trace creation unit 152 extracts, from the sign language word database 161, a data on a sign language action for each pair of words which is constituted by two successive words in the word string inputted into the word string input unit 151. The trace creation unit 152 creates, for the each pair of words, a trace which connects between an end point position of a sign language action having the same meaning as a prior word of the pair of words and a start point position of a sign language action having the same meaning as a posterior word thereof, based on the extracted sign language action data.

How to create a trace herein is not specifically limited. It is enough just to smoothly connect between an end position of a sign language action having a meaning corresponding to a prior word of the two paired words and a start position of a sign language action having a meaning corresponding to a posterior word. In connecting the two points, a general interpolation, for example, linear interpolation, quadratic interpolation or cubic interpolation can be used.

The trace creation unit 152 tentatively creates, as a glide, a simple trace generally used for connecting a pair of words. If the tentatively-created trace causes interference, another trace which causes no interference is created (re-created). The first-created trace is a tentative one in this sense. However, if the tentative trace causes no interference, the tentative trace as it is adopted as a glide between the two words in a sign language action.

The interference determination unit 153 determines that interference is generated between the parts of the robot R which are used when the robot R performs a sign language, if a distance between the parts on each of the traces created by the trace creation unit 152 is not within a prescribed allowable range.

If the interference determination unit 153 determines that interference is generated, the interference determination unit 153 outputs a status signal indicating that there is interference to the action adjustment unit 170. The status signal is used when the action adjustment unit 170 to be described later adjusts an action of the robot R. In this embodiment, the status signal includes a data indicating between which parts of the robot R the interference is produced (which may also be referred to as information on interfered parts), a data indicating a degree of the interference (which may also be referred to as information on a difference from a distance threshold), and a data on a time interval during which the interference is generated (which may also be referred to as information on an interference time).

The interference used herein is not just limited to a state in which the arm R3 comes in contact with any other part or an event in which the arm R3 collides with any other part. Even with no contact, interference is deemed to be generated if a distance between the arm R3 and other part is shorter than a prescribed distance. In determining interference with respect to an arm, well-known and common methods of determining interference can be used. For example, one of the methods adopts a model in which a link (such as an arm) disposed between joints of a robot is regarded as a cylinder, and it is detected that interference is generated when a distance between central axes of two cylinders becomes smaller than an allowable value, meaning that the cylinders get dented each other.

The parts between which interference is generated always include the arm R3 because a sign language action is executed using the arm R3. More specifically, the interference is generated between the right arm R3 (R) and the left arm R3 (L), the arm R3 and the head R4, the arm R3 and the body R2, or the arm R3 and the leg R1. Interference with the arm R3 means interference between: any part of the arm R3 referred to as similarly divided as in a human body such as, for example, the shoulder, the upper arm, the forearm, the wrist, the holding part (hand), and the fingers at the end of the hand; and any part other than the arm R3. Interference with the head R4 means interference between the arm R3 and any part of the head R4 referred to as similarly divided as in a human body such as, for example, the neck. Interference with the body R2 means interference between the arm R3 and any part of the body R2 referred to as similarly divided as in a human body such as, for example, the waist. Interference with the leg R1 means interference between the arm R3 and any part of the head R4 referred to as similarly divided as in a human body such as, for example, the thigh and the knee.

The action connection unit 154 connects sign language actions for words via the traces created in accordance with the inputted word strings such that no interference is generated between the parts of the robot R. If interference is determined to be generated between the parts of the robot R, the action connection unit 154 connects sign language actions of respective words via traces generated after appropriate adjustment of the actions by the action adjustment unit 170 to be described later. An appropriate sign language action for each word string can be thus created. The action connection unit 154 stores data on the created and appropriately-connected sign language action in the main storage part not shown. For example, when the robot R performs a sign language task as described above (at the time of execution of a sign language action), the action connection unit 154 reads out the data on the previously-created sign language action and outputs the data to the action execution unit 142.

The storage unit 160 is embodied by, for example, a generally-available hard disk or the like and stores therein the sign language word database 161.

The sign language word database 161 stores therein a sign language action data which is previously created such that, in units of words, no interference is generated between the parts of the robot R used for executing a sign language. The sign language action data is stored in association with a word having the same meaning as a sign language action corresponding thereto.

The sign language action data is a data on a robot action which is generally used for making the robot R take a desired posture in a robot action other than a sign language action. Herein, the term of the sign language action data is used because the present invention is directed to sign language. Note that the robot action data includes: a set of parameter values of joint angles, for each time, at respective joints in the parts R1-R4 of the robot R; an action start point coordinate; an action endpoint coordinate (a target position); and the like.

A sign language action data used for conducting an action having a meaning same as a sign language word corresponding thereto during a prescribed time period is hereinafter referred to as a word data. Below is described the word data with reference to a conceptual diagram of FIG. 4.

FIG. 4 shows an example of a word string in which a sentence in spoken language of "watashi wa shuwa ga dekimasu (I am able to use sign language)" is translated into a sign language. The translated sign language is made up of five pieces of word data 401, 402, 403, 404, and 405 which correspond to "watashi (I)", "shuwa (sign language)", "dekiru (able to use)", "desu (am)", and "return to home position", respectively.

The term "return to home position" herein represents an action of returning to a home position as a default posture.

In this example, the word data is schematically illustrated in belt-like form in a horizontal direction. The horizontal direction of the word data corresponds to an elapse of time along with movements of the robot R for performing sign language.

The word data 401 is divided into a preparation portion 401a in a former part of the word data 401 and an action portion 401b in a latter part thereof, as shown in FIG. 4. The preparation portion 401a is made separate from the action portion 401b just for purpose of illustration.

Similarly, a word data 402 is divided into a preparation portion 402a and an action portion 402b.

A word data 403 is divided into a preparation portion 403a and an action portion 403b.

A word data 404 is divided into a preparation portion 404a and an action portion 404b.

The term "the action portion" of a word data herein means, when the robot R conducts a sign language action based on the word data, a robot action data with which the robot R can make such movements that a person who sees the sign language action can visually recognize a meaning of the word represented by the sign language action.

The term "the preparation portion" of a word data herein does not directly represent a meaning of the word but means a robot action data with which the robot R makes some preparatory movement.

For example, a case is assumed in which someone who sees an entire sign language recognizes the following states P1, P2, and P3 in this order: P1 is a state in which the distance "has not yet reach the maximum"; P2, the distance "has reached the maximum"; and P3, the distance "is no longer the maximum". A position of a feature point at a time when the robot R starts performing the sign language is also assumed to be positions of respective tips of both hands thereof in a state where the robot R extends the both arms thereof to a maximum extent in a horizontal direction. During transition of the states from P1 to P2 to P3, it is at the time of the state P2 when the person recognizes a sign language corresponding to a word whose meaning is intended to be conveyed thereto starts.

In this case, a data corresponding to actions in the states from P1 to P2 is stored in an appropriate preparation portion of a word data.

In performing a sign language with movements of the both arms, the preparation portion of a word data stores therein, for each part of the robot R: a positional data such as position coordinates of respective tips of the hands when the robot R extends the both arms thereof to the maximum extent in the horizontal direction, as positions of respective start points for a sign language action using the both arms; and a time data such as a data indicating that how many more seconds from now is required to reach the position coordinates. In this example, a robot action data corresponding to actions in the state P2 and thereafter is stored in the action portion of the word data.

FIG. 4 also shows that glides 411, 412, 413, 414 are set between each of adjacent word data for purpose of illustration. In reality, the glides 411, 412, 413, 414 are each an action which does not have meaning but connects one sign language action which carries a meaning of a prior word, with another sign language action which carries a meaning of a posterior word. In this embodiment, a glide corresponds to a trace generated between a prior word data and a posterior word data by the trace creation unit 152.

Returning to FIG. 1, description of the configuration of the sign language action generating device 150 is continued below.

[7. Action Adjustment Unit]

If the interference determination unit 153 determines that the interference is generated between any of the parts of the robot R on the trace created for the pair of words, the action adjustment unit 170 adjusts a position coordinate or a velocity as a sign language action for the pair of words. The action adjustment unit 170 adjusts a sign language action so as to keep a distance between parts used in the determination by the interference determination unit 153 within an allowable range as well as within a prescribed threshold range. The prescribed threshold range is previously set such that meanings of both the prior word and the posterior word of the pair of words as the sign language action can be maintained.

In this embodiment, the action adjustment unit 170 uses, as the prescribed threshold range, a threshold range of a shift amount of a prescribed position coordinate or a velocity, or a threshold range of an evaluation function calculated based on the shift amount.

After adjusting the position coordinate or a velocity as the sign language action of a pair of words, the action adjustment unit 170 gives feedback to the trace creation unit 152. The trace creation unit 152 then creates a trace between the words using the adjusted data.

The adjustment of a position coordinate or a velocity made by the action adjustment unit 170 is referred to as an interword action adjustment processing. The interword action adjustment processing is a processing of updating a sign language action data in accordance with a word or generating a data in accordance with a glide between words.

In this embodiment, the action adjustment unit 170 is configured to include an endpoint coordinate setting unit 171, a via point setting unit 172, a timing change unit 173, a meaning determination unit 174, and a speech rate adjustment unit 175, as shown in FIG. 1, so as to perform method 1, method 2, and method 3 to be described hereinafter, each as a method of the interword action adjustment processing.

<End Point Coordinate Setting Unit>

The end point coordinate setting unit 171 adjusts, if interference is generated in a pair of words, a shift amount of a position coordinate of an end point of a sign language action having the same meaning as a prior word in the pair of words, or an evaluation function calculated based on the shift amount, within a prescribed threshold range. This is the method 1 of the interword action adjustment processing.

The end point coordinate setting unit 171 shifts the position coordinate of the end point of the sign language action having the same meaning as the prior word of the pair of words, such that a calculation result with respect to the prior word using a prescribed evaluation function regarding to which degree a word in a sign language action can be understood falls within a prescribed range within which the meaning of the prior word of the pair of words can still be maintained.

After the processing performed by the end point coordinate setting unit 171, if the interference is not generated any more and the meaning of the word can be maintained, the method 1 of the interword action adjustment processing is regarded to have been successfully completed. The action adjustment unit 170 gives feedback on information on the successful completion to the trace creation unit 152, thus allowing the trace between the pair of words to be determined. On the other hand, if the method 1 has not been successfully completed, the end point coordinate setting unit 171 passes the processing to the via point setting unit 172. Note that, in this embodiment, the meaning determination unit 174 to be described hereinafter is configured to determine a success or a failure of the processing.

Next is described the method 1 of the interword action adjustment processing with reference to the conceptual diagrams of FIGS. 5A to 5C.

FIG. 5A illustrates two pieces of word data 501, 502 as a pair of words in a case where interference is generated, similarly to the conceptual diagram of FIG. 4. A glide 511 is set between the word data 501, 502. The interference between the parts of the robot R is generated at the glide 511.

The word data 501 is a robot action data corresponding to a meaning of "explanation (setsumei in Japanese)" in sign language and is divided into a preparation portion 501a and an action portion 501b for purpose of illustration.

The word data 502 is a robot action data corresponding to a meaning of "time (jikan in Japanese)" in sign language and is divided into a preparation portion 502a and an action portion 502b for purpose of illustration.

That is, in this example, a prior word of the pair of words is the "explanation" and a posterior word thereof is the "time".

The end point coordinate setting unit 171 changes an action end point coordinate of the arm R3 which conducts a sign language action having a meaning of the "explanation", at an end point of the action portion 501b of the word data 501 so as to shift a position coordinate of an end point of the sign language action having the meaning of the "explanation" of the prior word.

The word data 501 after the above-described change is shown in FIG. 5B. The word data 501 shown in FIG. 5B is divided into a preparation portion 501a, an action portion 501c, and a changed portion 501d for purpose of illustration. The action portion 501c together with the changed portion 501*d* correspond to the action portion 501*b* of the word data 501 shown in FIG. 5A. As will be understood, the word data 502 of the "time" of the posterior word remains unchanged.

In FIG. 5B, the changed portion 501*d* of the word data 501 changed by the end point coordinate setting unit 171 is illustrated in exaggeration for purpose of illustration. Actually, the change shown as the changed portion 501*d* is a minor one. In this embodiment, the change is made so small that a person who sees a corresponding sign language does not recognize a feeling of strangeness, even if, when the prior word "explanation" of the word data 501 is updated according to the posterior word "time", the updated prior word "explanation" is used as a prior word of another posterior word. For example, as shown in a pair of words of FIG. 5C, the updated word data 501 can be used as a prior word, and the word data 503 can be used as a posterior word. Herein, the word data 503 is divided into a preparation portion 503*a* and an action portion 503*b* for purpose of illustration. A glide 512 is different from the glide 511.

If such a change is required to be minimum, the end point coordinate setting unit 171 may change an action end point coordinate of only one of the arms R3. In this embodiment, a dominant arm (assuming that is a right arm) is given higher priority as an arm whose action end point coordinate is changed. A flow of specific steps of the processing is to be described later.

<Via Point Setting Unit>

The via point setting unit 172 performs the method 2 of the interword action adjustment processing, if the interference is still generated between the pair of words in spite of the shift of the position coordinate of the end point by the end point coordinate setting unit 171. In the method 2, the via point setting unit 172 adjusts a shift amount of a position coordinate of a via point which is intervened between an end point of a prior word and a start point of a posterior word of the pair of words, or an evaluation function calculated based on the shift amount, within a prescribed threshold range.

The via point setting unit 172 cancels the method 1 of the interword action adjustment processing, defaults the position coordinate, and then executes the method 2 of the interword action adjustment processing.

The via point setting unit 172 shifts the position coordinate of the via point, such that a calculation result with respect to the pair of words using a prescribed evaluation function regarding to which degree a word in a sign language action can be understood falls within a prescribed range in which meanings of the prior word and the posterior word of the pair of words can still be maintained.

After the processing performed by the via point setting unit 172, if the interference is not generated anymore and the meaning of the word can still be maintained, the method 2 of the interword action adjustment processing is regarded to have been successfully completed. The action adjustment unit 170 gives feedback on information on the successful completion to the trace creation unit 152, thus allowing a trace between the pair of words to be determined. On the other hand, if the method 2 has not been successfully completed, the via point setting unit 172 passes the processing to the timing change unit 173. Note that, in this embodiment, the meaning determination unit 174 to be described hereinafter is configured to determine a success or a failure of the processing.

Figure 6A:
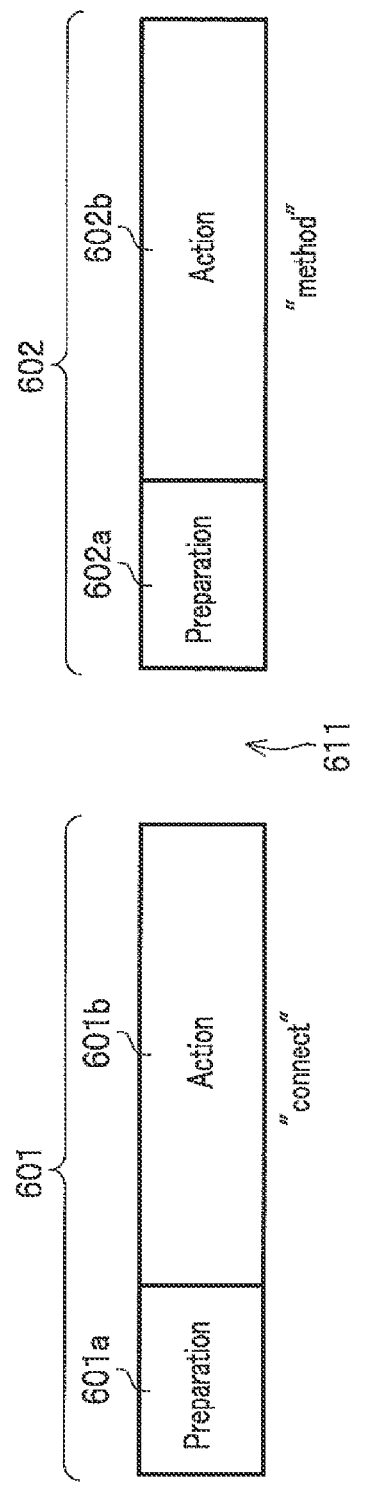
FIGS. 6A and 6B are each a conceptual diagram illustrating a via point which is set between word data by the via point setting unit of the sign language action generating device of FIG. 1, according to the embodiment.
Figure 6B:
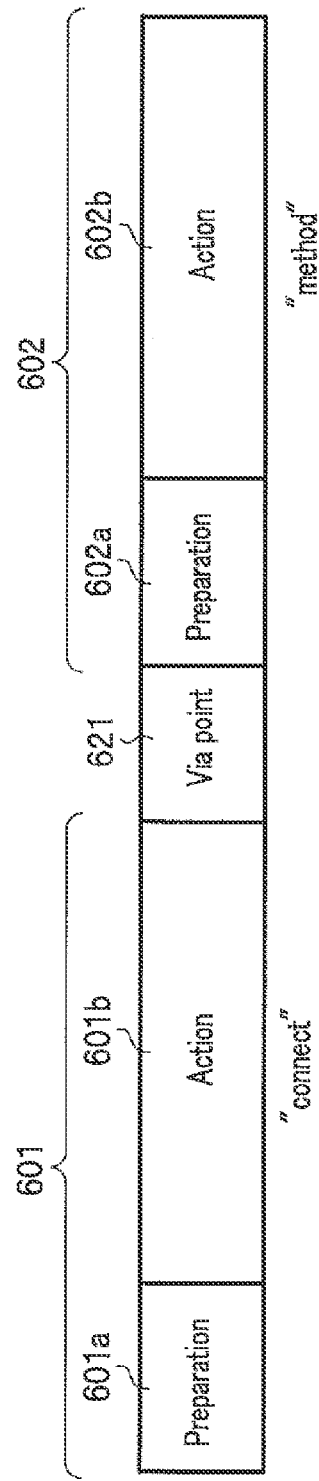

Next is described the method 2 of the interword action adjustment processing with reference to the conceptual diagrams of FIGS. 6A and 6B.

FIG. 6A illustrates two pieces of word data 601, 602 as a pair of words in a case where interference is generated, similarly to the conceptual diagram of FIG. 4. A glide 611 is set between the word data 601, 602. The interference between the parts of the robot R is generated at the glide 611.

The word data 601 is a robot action data corresponding to a meaning of "connect (tsunageru in Japanese)" in sign language and is divided into a preparation portion 601*a* and an action portion 601*b* for purpose of illustration.

The word data 602 is a robot action data corresponding to a meaning of "method (houhou in Japanese)" in sign language and is divided into a preparation portion 602*a* and an action portion 602*b* for purpose of illustration.

That is, in this example, a prior word of the pair of words is the "connect" and a posterior word thereof is the "method".

The via point setting unit 172 shifts a via point in the glide 611 which corresponds to a first-generated trace (a tentative trace) between a sign language action having the meaning of the "connect" of the prior word and a sign language action having the meaning of the "method" of the posterior word, created by the trace creation unit 152 first. In other words, the via point setting unit 172 adds another via point in place of the original via point on the tentative trace. The addition of another via point is schematically illustrated in FIG. 6B. As shown in FIG. 6B compared to FIG. 6A, the word data 601, 602 remain unchanged, but the glide 611 is replaced by the via point 621. The via point setting unit 172 newly generates a data on the via point 621.

To minimize such a change, the via point setting unit 172 can add a new via point between an action end point coordinate of the prior word and an action start point coordinate of the posterior word of only one of the both arms R3. In this embodiment, an action of a dominant arm (assuming that is a right arm) is given higher priority to adding a via point between a pair of words, than an action of the other arm. A flow of specific steps of the processing is to be described later.

<Timing Change Unit>

The timing change unit 173 performs the method 3 of the interword action adjustment processing, if the interference is still generated in the pair of words in spite of the shift of the position coordinate of the via point by the via point setting unit 172. In the method 3, the timing change unit 173 adjusts a shift amount of a velocity of a sign language action having the same meaning as the posterior word of the pair of words, or an evaluation function calculated based on the shift amount, within a prescribed threshold range.

The timing change unit 173 cancels the method 2 of the interword action adjustment processing, defaults the position coordinate, and then executes the method 3 of the interword action adjustment processing.

The timing change unit 173 changes the velocity of the sign language action having the same meaning as the posterior word of the pair of words, such that a calculation result with respect to the posterior word using a prescribed evaluation function regarding to which degree a word in a sign language action can be understood falls within a prescribed range within which the meaning of the posterior word of the pair of words can still be maintained.

After the processing performed by the timing change unit 173, if the interference is not generated any more and the meaning of the word can be maintained, the method 3 of the interword action adjustment processing is regarded to have been successfully completed. The action adjustment unit 170 gives feedback on information on the successful completion to the trace creation unit 152, thus allowing a trace between the pair of words to be determined. On the other hand, if the method 3 has not been successfully completed, the timing change unit 173 records an error and terminates the processing. Note that, in this embodiment, the meaning determination unit 174 to be described hereinafter is configured to determine a success or a failure of the processing.

Next is described the method 3 of the interword action adjustment processing with reference to the conceptual diagrams of FIGS. 7A and 7B.

FIG. 7A illustrates two pieces of word data 701, 702 as a pair of words in a case where interference is generated, similarly to the conceptual diagram of FIG. 4. A glide 711 is set between the word data 701, 702. The interference between the parts of the robot R is generated at the glide 711.

The word data 701 is a robot action data corresponding to a meaning of "collect (atsumeru in Japanese)" in sign language and is divided into a preparation portion 701a and an action portion 701b for purpose of illustration.

The word data 702 is a robot action data corresponding to a meaning of "beautiful (kirei in Japanese)" in sign language and is divided into a preparation portion 702a and an action portion 702b for purpose of illustration.

That is, in this example, a prior word of the pair of words is the "collect" and a posterior word thereof is the "beautiful".

FIG. 7A includes a graph with a time axis as a horizontal axis which schematically illustrates a state in which the interference is generated at the glide 711 between the right arm R3 (R) and the left arm R3 (L). The graph shows that, for example, the right arm R3 (R) and the left arm R3 (L) move at the same timing from a given time for a preparation action (t0) until a start time of a main action (t2). A bar graph thus represents a time period of a preparation action of each of the arms R3.

In this case, to minimize a change in a velocity of a sign language action meaning the "beautiful" of the posterior word, in this embodiment, the timing change unit 173 is configured to adjust a velocity of a preparation action by adjusting a data on a time which is described in the preparation portion 702a of the word data 702 on the "beautiful" of the posterior word. In this embodiment, a dominant arm (assuming that is a right arm) is given higher priority as an arm whose velocity is changed, because what is necessary herein is only a change in a relative velocity.

The adjustment of the time data described in the preparation portion 702a of the word data 702 used herein means that a word which has the same trace of a sign language action meaning the "beautiful" of the posterior word, but has different velocities thereof for each of the parts of the robot R is additionally registered. The trace creation unit 152 thus re-creates a trace between the prior word "collect" and the posterior word "beautiful" of the pair of words, using the additionally-registered sign language action data.

In the above example, when the sign language action of the "collect" is completed, the tips of the hands get closer to each other, with palms thereof down or toward the body R2 at approximately the same height in a three dimensional space.

When the robot R starts the sign language action of the "beautiful", it is necessary for the robot R to turn the tip of the left hand forward with its palm facing upward and also turn the tip of the right hand leftward with its palm facing downward at a position slightly above the left hand and nearer the body R2. To avoid interference in a glide, it is required that the palm of the right hand is freed at a timing earlier than usual. Herein, in an action in a preparation portion of a word data of a posterior word (a preparation action), a velocity of the right arm R3 (R) is made larger, such that an action made by the right hand is finished earlier than usual.

FIG. 7B includes a graph similar to the graph of FIG. 7A. To simply show that the right and left hands move at velocities and timings different from each other, in the graph, two bar graphs for the right arm R3 (R) and the left arm R3 (L) start at the same point in time, which is a time t0. The left arm R3 (L) moves from the time t0 until a time t2. The right arm R3 (R) moves from the time t0 until a time t1 which is earlier than the time t2. Note that a flow of specific steps of the processing is described later.

<Meaning Determination Unit>

The meaning determination unit 174 determines whether or not meanings of the prior word and the posterior word of the pair of words can still be maintained with respect to the part which has been determined by the interference determination unit 153 that interference was generated, after the interference is eliminated therefrom by the interword action adjustment processing by the endpoint coordinate setting unit 171, the via point setting unit 172, or the timing change unit 173.

The meaning determination unit 174 determines whether or not the meaning of the prior word of the pair of words can still be maintained using an evaluation function, if the method 1 of the interword action adjustment processing successfully eliminates the interference.

The meaning determination unit 174 determines whether or not the meanings of the prior word and the posterior word of the pair of words can still be maintained using the evaluation function, if the method 2 of the interword action adjustment processing successfully eliminates the interference.

The meaning determination unit 174 determines whether or not the meaning of the posterior word of the pair of words can still be maintained using the evaluation function, if the method 3 of the interword action adjustment processing successfully eliminates the interference.

It is assumed herein that a function form of the evaluation function, a parameter inputted into the evaluation function, a range of values as a criterion for the determination, and the like are previously specified by means of actual measurement or simulation estimate.

In this embodiment, the meaning determination unit 174 is assumed to use, as an example, an evaluation function J shown in Expression 1 as follows:

$$J = \omega 1 \times \Delta 1 + \omega 2 \times \Delta 2 + \omega 3 \times \Delta 3 \quad \text{Expression 1}$$

In Expression 1, $\Delta 1$ indicates an "amount deviated from a standard value of an end point coordinate of a prior word" generated in the method 1 of the interword action adjustment processing. $\Delta 2$ indicates an "amount deviated from a standard value of a via point" generated in the method 2 of the interword action adjustment processing. $\Delta 3$ indicates an "amount deviated from a standard value of a timing of a posterior word" generated in the method 3 of the interword action adjustment processing. Each of $\omega 1$, $\omega 2$, and $\omega 3$ indicates a weight. A value of the each weight can be set accordingly.

In a case where the method 1 of the interword action adjustment processing is used, the meaning determination unit 174 designates values of both $\Delta 2$ and $\Delta 3$ on a right hand side of Expression 1 at 0. In a case where the method 2 of the interword action adjustment processing is used, the meaning determination unit 174 designates values of both $\Delta 3$ and $\Delta 1$ at 0. In a case where the method 3 of the interword action adjustment processing is used, the meaning determination unit 174 designates values of both $\Delta 1$ and $\Delta 2$ at 0. Then, the meaning determination unit 174 calculates the evaluation function J in the respective cases. The meaning determination unit 174 can determine that a meaning of a target word is still maintained, if a calculation result of the right hand side of Expression 1 is equal to or smaller than a prescribed value. This is because, in the evaluation function J shown in Expression 1, the smaller the each amount deviated from the standard value in the three methods, the smaller each of the calculation results of the right hand side of Expression 1.

In Expression 1, if the deviated amount Δ1 of an endpoint coordinate or the deviated amount Δ2 of a via point is expressed in a prescribed unit of length (for example, in centimeters) and the deviated amount Δ3 of a timing is expressed in a prescribed unit of time (for example, in seconds), values of the first, second, and third terms of Expression 1 can be adjusted such that the values are expressed on a scale comparable to each other.

In this embodiment, priority for being used as the interword action adjustment processing is given to the method 2 over the method 3, and further, to the method 1 over the method 2. This makes it possible for the methods to be used in such an order that a meaning of a target word can be maintained more easily, if the three methods produce their respective deviated amounts in similar degrees. In other words, if the method 1 of the interword action adjustment processing has not been successfully completed and the method 2 is used, an allowable range of the deviated amount in the method 2 becomes narrower than that of the method 1. That of the method 3 becomes further narrower than that of the method 2. Therefore, regarding the evaluation function J shown in Expression 1, values representing the respective weights are set to satisfy Expression 2 as follows:

$$\omega 1 < \omega 2 < \omega 3 \quad \text{Expression 2}$$

<Speech Rate Adjustment Unit>

If the robot Ruses a sign language, and at the same time, utters a word having the same meaning as the sign language, the speech rate adjustment unit 175 adjusts a speech rate of the uttered word based on a time required for an action of the sign language. The speech rate adjustment unit 175 acquires information on the time required for the sign language action from the sign language word database 161 and also acquires information on a speech time period of a synthesized voice sound data from the main storage part not shown. The speech rate adjustment unit 175 calculates a rate of change for adapting the speech time period of the voice sound data to the time required for the sign language action and outputs the calculated rate of change and an instruction to change the speech rate to the audio processor 110 which outputs a synthesized voice sound. With this configuration, the audio processor 110 utters a word having the same meaning as the sign language in synchronization with a movement for the sign language, based on a speech data for utterance stored in the main storage part not shown, the instruction to change the speech rate from the speech rate adjustment unit 175, and an instruction to synchronize the speech with the sign language action from the action execution unit 142.

If the end point coordinate setting unit 171, the via point setting unit 172, or the timing change unit 173 performs the interword action adjustment processing, and if information on time required for performing a sign language action having already been registered in the sign language word database 161 is thus changed, the speech rate adjustment unit 175 adjusts a speech rate using the information on the time changed.

[8. Flow of Processing by Sign Language Action Generating Device]

Figure 8:
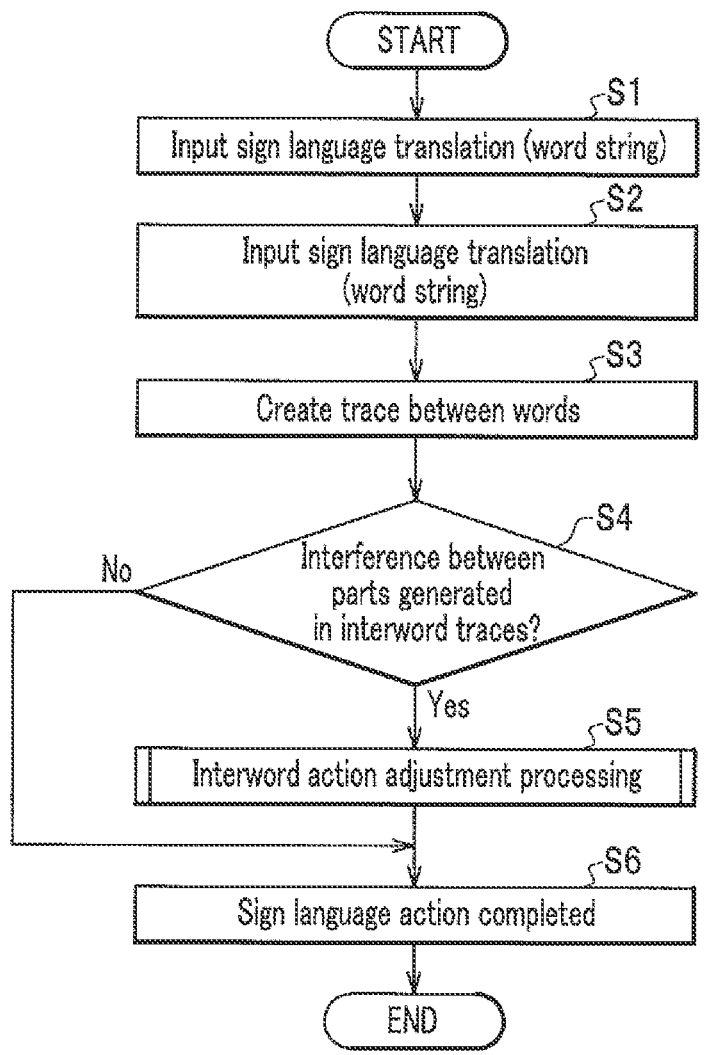
FIG. 8 is a flowchart illustrating an outline of a flow of a processing performed by the sign language action generating device of FIG. 1 according to the embodiment.

Next is described a flow of a processing by the sign language action generating device 150 with reference to FIG. 8 (see also FIG. 1 where necessary). FIG. 8 is a flowchart illustrating an outline of the processing performed by the sign language action generating device 150 of FIG. 1.

The sign language action generating device 150 inputs a sign language translation (a word string) via the word string input unit 151 (step S1). The sign language action generating device 150 extracts appropriate actions from the sign language word database 161 via the trace creation unit 152 and arranges the actions according to the word string (step S2). The trace creation unit 152 creates respective traces between the words (step S3).

The sign language action generating device 150 determines whether or not interference between the parts is generated in each of the interword traces, via the interference determination unit 153 (step S4). If the interference between the parts is determined to be generated in the interword trace (step S4: Yes), the action adjustment unit 170 carries out the interword action adjustment processing (step S5). Then, if the interference between the parts is not generated anymore in the interword trace, and also if an intended meaning of a series of sign language actions corresponding to the word string connected by the action connection unit 154 can be conveyed, a sign language action for the each word string is completed (step S6). Note that, in step S4, if the interference between the parts is not determined to be generated in the interword trace (step S4: No), the sign language action generating device 150 skips step S5.

[9. Interword Action Adjustment Processing]

The method 1, the method 2, and the method 3 of the interword action adjustment processing are applied to each pair of words in this order.

<Method 1>

Figure 9:
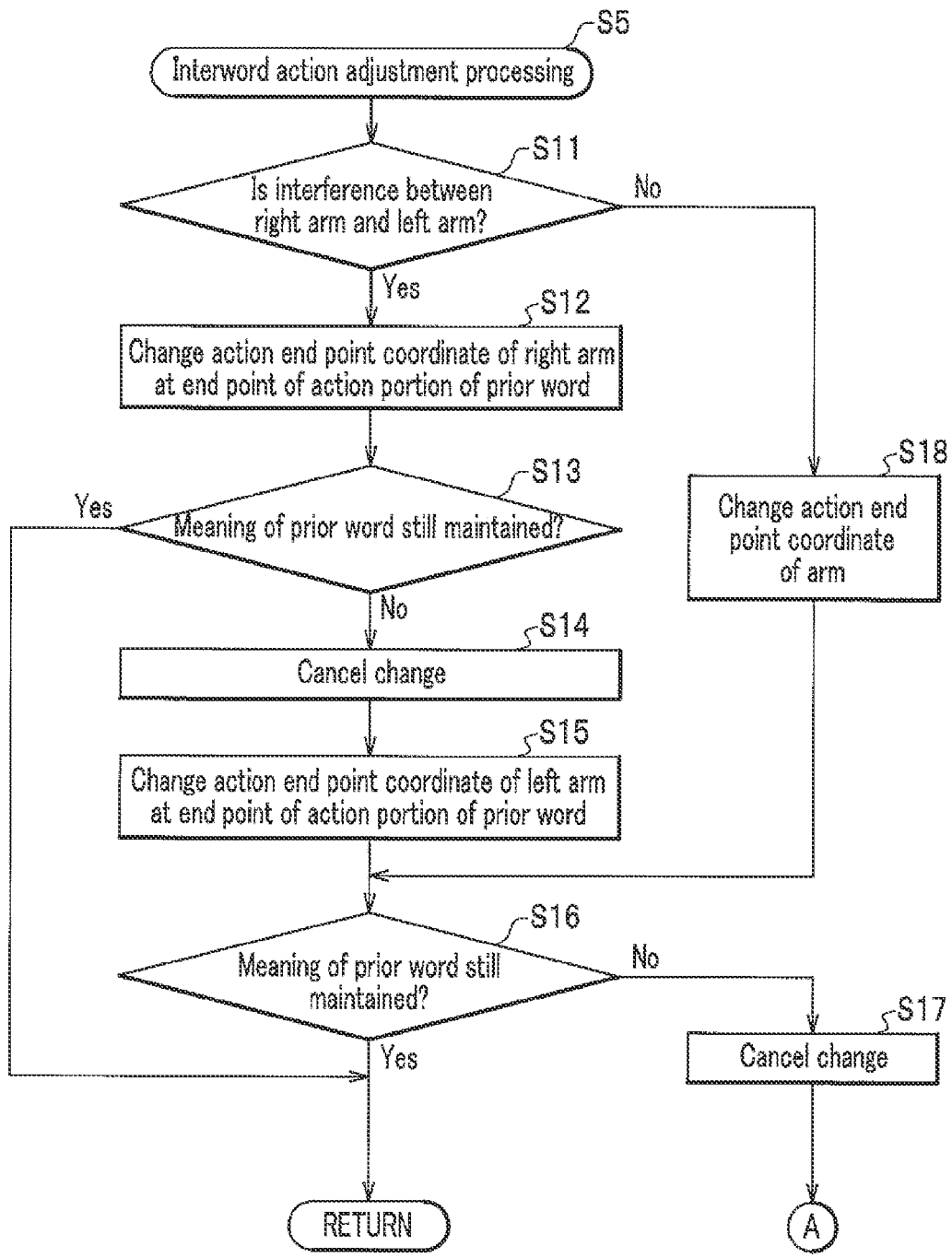
FIG. 9 is a flowchart illustrating an interword action adjustment processing of FIG. 8 according to the embodiment.

In the method 1, as shown in FIG. 9, if the interference between the parts generated in the interword traces is an interference between the right arm R3 (R) and the left arm R3 (L) (step S11: Yes), the end point coordinate setting unit 171 of the action adjustment unit 170 changes an action end point coordinate of the right arm R3 (R), at an endpoint of an action portion of a prior word of a pair of words with respect to a part at which the interference between the parts has been determined to be generated (step S12).

The meaning determination unit 174 determines whether or not a meaning of the prior word of the pair of words can still be maintained with respect to the part at which the interference has been determined to be generated (step S13). If the meaning of the prior word of the pair of words can still be maintained with respect to the part at which the interference has been determined to be generated (step S13: Yes), because no change is made to the posterior word, the meanings of both the prior word and the posterior word can still be maintained. Thus, the endpoint coordinate setting unit 171 successfully adjusts the interword action of the pair of words.

In step S13, if the meaning of the prior word of the pair of words cannot be maintained with respect to the part at which the interference has been determined to be generated (step S13: No), the end point coordinate setting unit 171 cancels the change made in step S12 described above (step S14). The end point coordinate setting unit 171 then changes an action end point coordinate of the left arm R3 (L), at the end point of the action portion of the prior word of the pair of words with respect to the part at which the interference has been determined to be generated (step S15).

The meaning determination unit 174 determines whether or not the meaning of the prior word of the pair of words can still be maintained with respect to the part at which the interference has been determined to be generated (step S16). If the meaning of the prior word of the pair of words can still be maintained with respect to the part at which the interference has been determined to be generated (step S16: Yes), because no change is made to the posterior word, the meanings of both the prior word and the posterior word can still be maintained.

Thus, the endpoint coordinate setting unit 171 successfully adjusts the interword action of the pair of words.

In step S11 described above, if the interference between the parts generated in the interword trace is an interference between the arm R3 and a part other than the arm R3 (step S11: No), the end point coordinate setting unit 171 changes the action end point coordinate of the arm R3, at the end point of the action portion of the prior word of the pair of words with respect to the part at which the interference has been determined to be generated (step S18). Note that, if interference is generated between, for example, the arm R3 and the head R4 and an action end point coordinate of the head R4 is changed, a sign language conveys such nuances as "agreement", "denial", and "hope" in some cases according to a shift direction of the change. Therefore, the change as described above will not be made herein.

In step S16 as described above, the meaning determination unit 174 determines whether or not the meaning of the prior word can still be maintained. If the meaning determination unit 174 successfully adjusts the interword action of an inputted sign language translation (word string) with respect to the part at which the interference has been determined to be generated, the action adjustment unit 170 returns the processing to step S6.

In step S16, if the meaning of the prior word of the pair of words cannot be maintained with respect to the part at which the interference has been determined to be generated (step S16: No), the end point coordinate setting unit 171 cancels the change having been made so far in step S12 or step S18 described above (step S17). The action adjustment unit 170 then advances the processing to step S21 (see FIG. 10) so as to adjust the interword action of the part using the method 2.

<Method 2>

Figure 10:
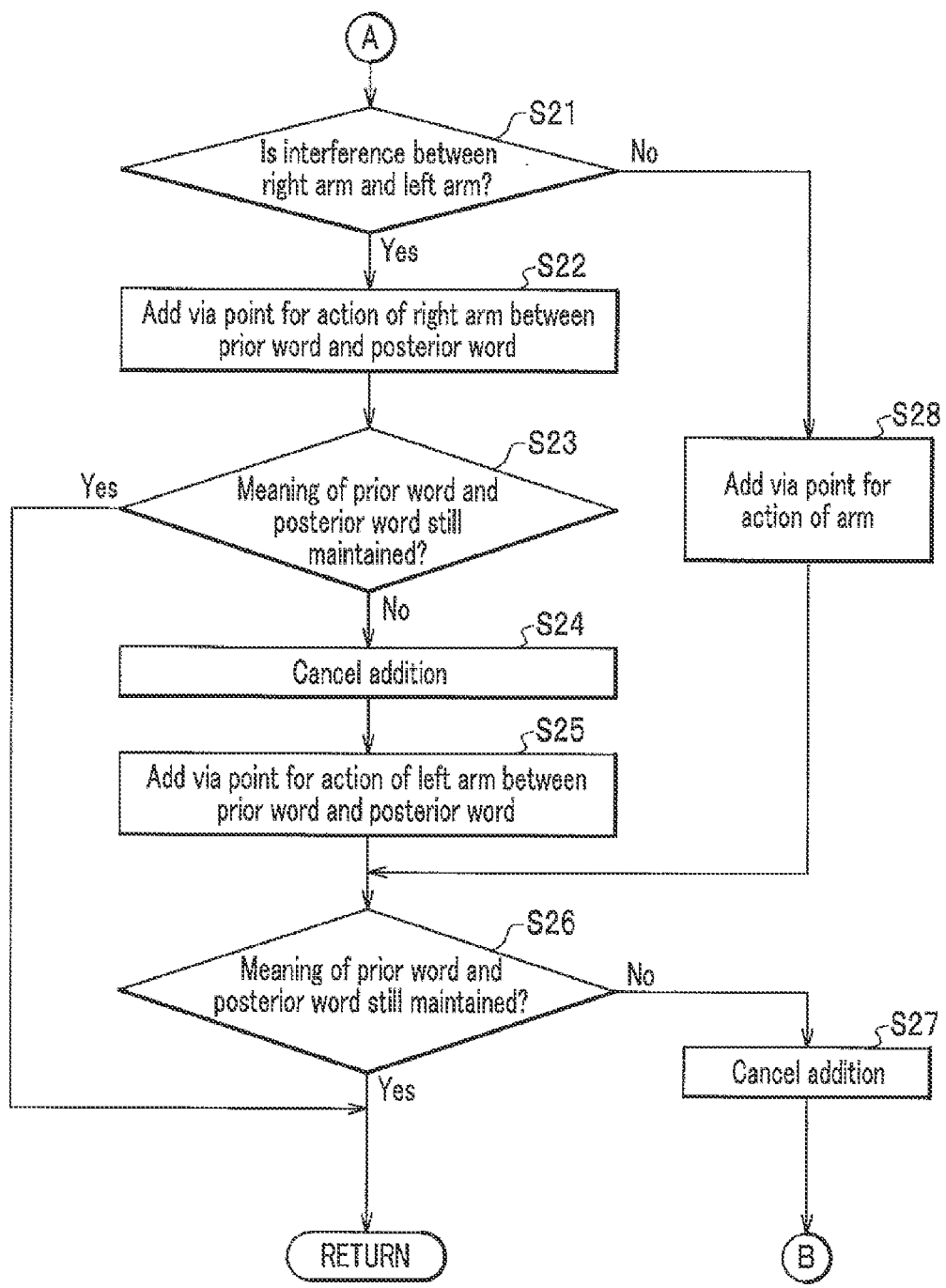
FIG. 10 is a flowchart illustrating a continuation of the interword action adjustment processing of FIG. 9, according to the embodiment.

In the method 2, as shown in FIG. 10, if the interference with respect to the part at which the interference has not been successfully eliminated by the method 1 is an interference between the right arm R3 (R) and the left arm R3 (L) (step S21: Yes), the via point setting unit 172 of the action adjustment unit 170 adds a via point for an action of the right arm R3 (R) between the prior word and the posterior word of the pair of words with respect to the part at which the interference has been determined to be generated (step S22). That is, the via point setting unit 172 adds a coordinate data of the via point as a data posterior to the action end point coordinate of the right arm R3 (R), to the end point of the action portion of the prior word.

The meaning determination unit 174 determines whether or not meanings of the prior word and the posterior word of the pair of words can still be maintained with respect to the part at which the interference has been determined to be generated (step S23). If the meanings of the prior word and the posterior word of the pair of words can still be maintained with respect to the part at which the interference has been determined to be generated (step S23: Yes), the via point setting unit 172 successfully adjusts the interword action of the pair of words.

In step S23 as described above, at least one of the meanings of the prior word and the posterior word cannot be maintained with respect to the part at which the interference has been determined to be generated (step S23: No), the via point setting unit 172 cancels the addition made in step S22 (step S24). The via point setting unit 172 adds a via point for an action of the left arm R3 (L), to an appropriate position between the prior word and the posterior word of the pair of words with respect to the part at which the interference has been determined to be generated (step S25). That is, the via point setting unit 172 adds a coordinate data on the via point as a data posterior to the action end point coordinate of the left arm R3 (L), at the end point of the action portion of the prior word.

The meaning determination unit 174 determines whether or not the meanings of the prior word and the posterior word of the pair of words can still be maintained with respect to the part at which the interference has been determined to be generated (step S26). If the meanings of the prior word and the posterior word of the pair of words can still be maintained with respect to the part at which the interference has been determined to be generated (step S26: Yes), the via point setting unit 172 successfully adjusts the interword action of the pair of words.

In step S21 described above, if the interference between the parts is an interference between the arm R3 and a part other than the arm R3 (step S21: No), the via point setting unit 172 adds a via point of an action of the arm R3 to an appropriate position between the prior word and the posterior word of the pair of words, with respect to the part at which the interference has been determined to be generated (step S28). Note that the reason why the via point of an action by a part other than the arm R3 is the same as that of the method 1.

In step S26 described above, the meaning determination unit 174 determines whether or not the meanings of the prior word and the posterior word can still be maintained. If the via point setting unit 172 successfully adjusts an interword action in the inputted sign language translation (word string) with respect to each of the parts at which the interference has been determined to be generated, the action adjustment unit 170 returns the processing to step S6.

In step S26 described above, if the meanings of the prior word and the posterior word cannot be maintained with respect to the part at which the interference has been determined to be generated (step S26: No), the via point setting unit 172 cancels the addition having been made so far (step S25 or step S28 described above). The action adjustment unit 170 advances the processing to step S31 so as to adjust the interword action with respect to the part by the method 3 (see FIG. 11).

<Method 3>

Figure 11:
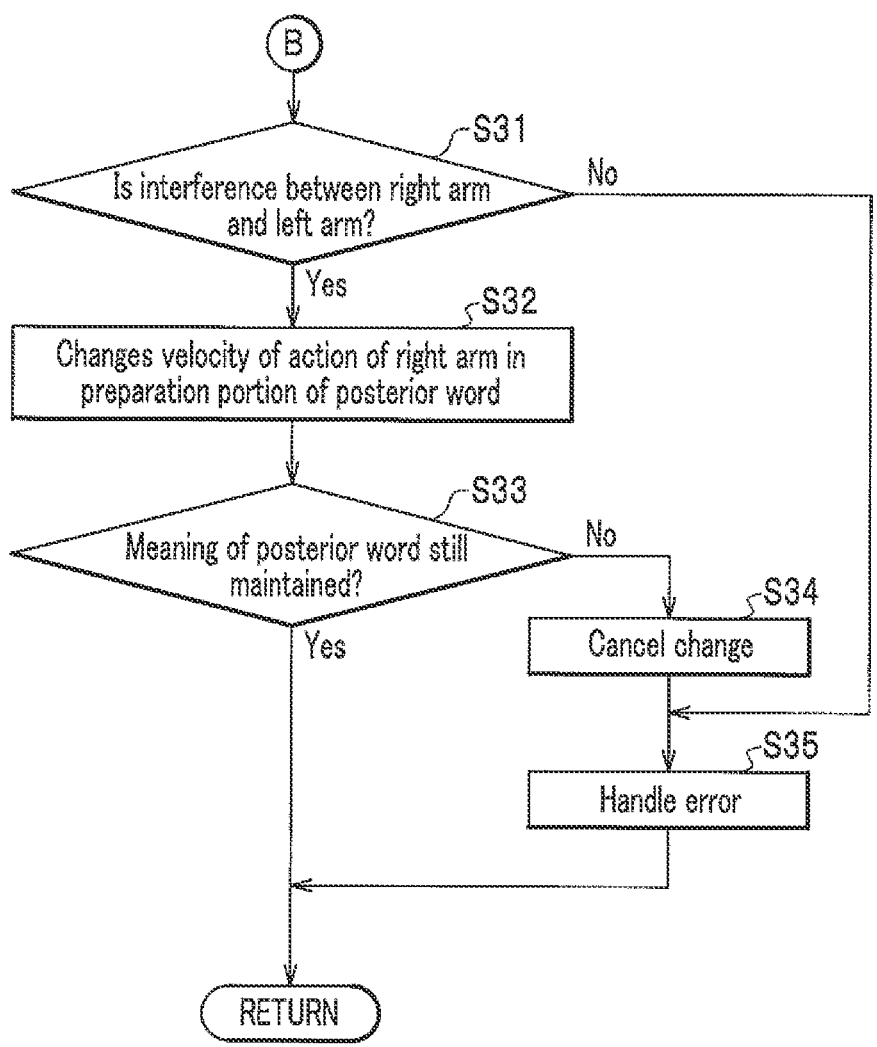
FIG. 11 is a flowchart illustrating a continuation of the interword action adjustment processing of FIG. 10, according to the embodiment.

In the method 3, as shown in FIG. 11, if the interference with respect to the part at which the interference has not been successfully eliminated by the method 2 is an interference between the right arm R3 (R) and the left arm R3 (L) (step S31: Yes), the timing change unit 173 of the action adjustment unit 170 changes a velocity of an action of the right arm R3 (R) in a preparation portion of the posterior word of the pair of words with respect to the part at which the interference has been determined to be generated (step S32). That is, the timing change unit 173 relatively changes the velocity of an action of the right arm R3 (R) and a velocity of an action of the left arm R3 (L) in an action of the preparation portion of the posterior word, to thereby change a timing of the actions of the right arm R3 (R) and the left arm R3 (L).

The meaning determination unit 174 determines whether or not the meaning of the posterior word of the pair of words can still be maintained with respect to the part at which the interference has been determined to be generated (step S33). If the meaning of the posterior word can still be maintained with respect to the part at which the interference has been determined to be generated (step S33: Yes), because no change is made to the prior word, the meanings of both the prior word and the posterior word can still be maintained. Thus, the timing change unit 173 successfully adjusts the interword action of the pair of words. If the timing change unit 173 successfully adjusts the interword action in the inputted sign language translation (word string) with respect to each of the parts at which the interference has been determined to be generated, the action adjustment unit 170 returns the processing to step S6.

In step S33 described above, if the meaning of the posterior word cannot be maintained with respect to the part at which the interference has been determined to be generated (step S33: No), the timing change unit 173 cancels the change in step S32 described above (step S34). The timing change unit 173 performs an error handling in which an error is recorded that an interword action adjustment of the pair of words has failed (step S35), and the action adjustment unit 170 returns the processing to step S6.

In step S31 described above, if the interference between the parts is an interference between the arm R3 and a part other than the arm R3 (step S31: No), the action adjustment unit 170 advances the processing to step S35.

Note that, regarding information on the part at which the method 3 has not been successful, the action adjustment unit 170 may notify the management computer 3 of the information through communications or inform surrounding people of the information via a speech of the robot R. This makes it possible for an operator who becomes aware of the error with respect to the part at which the interference has not been successfully eliminated by the method 3, to create a new sign language translation (word string) with respect the part by replacing at least one of the prior word and the posterior word with another word within a range within which an intended meaning similar to the originally-inputted sign language translation (word string) can be conveyed and to input the newly-created sign language translation into the sign language action generating device 150.

As described above, if the interference is generated between the parts including the arm R3 of the robot R in a trace as a glide between words generated for each pair of words of an inputted sign language translation (word string), the sign language action generating device 150 according to the embodiment of the present invention can adjust a position coordinate or a velocity of the pair of words as a sign language action within a prescribed threshold range such that no interference is generated, and at the same time, a meaning of each word of the pair of words is maintained. With the adjustment, even if combinations of a pair of words constituting a series of sign language actions otherwise cause interference of the arm at a glide between the words, the series of sign language actions represented by the word combinations can be appropriately performed.

An operation as described next is also possible. Assume a case in which, for example, a data on a predetermined sentence (word string) corresponding to a series of sign language actions already exists in which no interference of an arm of a robot is generated, and a new sign language action is generated with one of the sign language words thereof replaced by another. Depending on the new word, an interference of the arm may be generated at a glide. Even in this case, the sign language action generating device 150 according to the embodiment of the present invention makes it possible to generate no interference of the arm and also to create a trace which can maintain a meaning of a sign language as intended. This enables generation of a large number of series of general-purpose sign language actions corresponding to sign language sentences. Thus, the sign language performed by the robot R becomes highly expressive and contributes to smooth communication.

The sign language action generating device and the communication robot equipped with the same of the present invention has been explained in the embodiment above. The present invention is not, however, limited to the aforementioned embodiment. In the present embodiment, description has been made assuming that the communication robot is equipped with the sign language action generating device. Another configuration is also possible in which, for example, the management computer 3 shown in FIG. 1 or a terminal not shown connected to the robot-dedicated network 2 via an external network is equipped with the sign language action generating device. A yet another configuration is possible in which a program for executing the above-described units of the sign language action generating device 150 is installed on a generally available computer, which can also have advantageous effects similar to the above configurations.

The storage unit 160 of the sign language action generating device 150 may temporarily store therein a sign language translation (word string) for creating a series of sign language actions (sign language actions in word strings) or data on the created sign language actions.

In a course of creating a sign language action, if a sign language action data having already been registered needs to be updated, an updated data may be stored in an appropriate manner. This makes it possible to use the updated sign language action data from next time.

In a case where a data volume in the sign language word database 161 is enormous, an original data may be stored in a storage means in the management computer 3 and only a necessary portion of the original data may be acquired and stored in the sign language word database 161.

In the embodiment described above, description is made assuming that the communication robot is a bipedal walking type autonomous mobile robot. However, the communication robot is not limited to this and may be any other robot as long as the robot has an upper body, in particular, both arms similar to those of a human and can perform a sign language action. In the present invention, description is made also assuming that a Japanese word basically corresponds one-to-one to a sign language action, which is called the Manually Coded Japanese. However, Japanese may be replaced by any other language.

In the embodiment, description is made also assuming that the action adjustment unit 170 of the sign language action generating device 150 includes the endpoint coordinate setting unit 171, the via point setting unit 172, and the timing change unit 173, as the best mode for carrying out the present invention. However, at least only one of the units 171, 172, 173 may be included. Note that, in a case where two or more of the units 171, 172, 173 is included, the method 2 and the method 1 may be given higher priority to be used than the method 3, and the method 1 may be given higher priority to be used than the method 2.

<Variations of Evaluation Function>

In the embodiment, the meaning determination unit 174 of the sign language action generating device 150 uses the evaluation function J represented by Expression 1 having a deviated amount from a standard value generated in the interword action adjustment processing. However, the present invention is not limited to this, and can be carried out with various modifications, for example, as described below.

One example of another evaluation function is an evaluation function with respect to a degree of similarity between a correct sign language action as a standard action for successive sign language words including glides and a sample action in which any of an end point of a prior word, a glide, and a preparation action of a posterior word of the sign language action is changed.

In this case, before the evaluation function is stored in the sign language action generating device, an expert in sign language may: observe the correct sign language action and a plurality of sample actions performed by the robot; determine a sample action which is estimated to maintain meanings of each of a pair of a prior word and a posterior word; examine a correlation between the sample action and a word data used in the sample action; calculate a feature amount of the correlation; and calculate an evaluation function with an appropriate weight of the feature amount or the like, and a threshold range of the evaluation function using a well-known estimation technique. This enables a change of designing the evaluation function. Or, the evaluation function may be determined based on actual measurement and simulation.

In creating a sample action in which a glide is changed, in addition to a restriction condition that the meanings of each pair of a prior word and a posterior word are maintained, such a restriction condition may be added that an action corresponding to the prior word and the posterior word including the glide is not similar to an action of other words. This is preferable because a false recognition of the meanings by a sign language reader can be further prevented.

If the evaluation function with respect to the degree of similarity is used, before the evaluation function is stored in the sign language action generating device, the degree of similarity of a video image can be calculated using, for example, a well-known image processing. A video image of a correct posture of a sign language action by a robot for a pair of words is prepared as a standard video image. A video image of a posture of a sample sign language action by the robot for the pair of words is also prepared as a comparative video image. At this time, it is assumed that no interference of an arm or the like of the robot is generated. The standard video image and the comparative video image are subjected to an image processing of extracting a feature point, to thereby extract respective feature amounts of coordinate positions of a joint, a tip of a hand, and the like from the both video images. The degree of similarity between the both video images can be calculated from the feature points. Then, the evaluation function and a standard value for determination can be determined based on estimation by an expert who observes the both video images and on the calculated similarity.

In another example, three different evaluation functions can be used according to the method 1 to the method 3 of the interword action adjustment processing.

In this case, the evaluation function for the method 1 is obtained by inputting a data including a data on a changed portion of a word data on a prior word of a pair of words and can be used for determination based on a degree of similarity of a calculation result.

An evaluation function for the method 2 is obtained by inputting a data including: a word data on the prior word of the pair of words; a word data on a posterior word thereof; and a data on a via point added to a glide thereof, and can be used for determination based on a degree of similarity of a calculation result.

An evaluation function for the method 3 is obtained by inputting a data including a data on a preparation portion of a word data on the posterior word of the pair of words and can be used for determination based on a degree of similarity of a calculation result.

The invention claimed is:

1. A sign language action generating device which creates a sign language action for each word string by connecting sign language actions for each word used in a sign language performed by a robot, the robot including, as parts thereof, a body, a head, two arms, two legs, and a controller, each of the latter four parts being connected to the body, the sign language action generating device comprising:

a storage unit that stores therein a sign language word database in which a sign language action data which is previously created such that, in units of words, no interference is generated between the parts of the robot used for performing a sign language, the sign language action data being stored in association with a word having the same meaning as a sign language action corresponding thereto;

a word string input unit into which a word string is inputted;

a trace creation unit that extracts, from the sign language word database, a data on a sign language action for each pair of words which is constituted by two successive words in the word string inputted into the word string input unit, and creates, for the each pair of words, a trace which connects between an end point position of a sign language action having the same meaning as a prior word of the pair of words and a start point position of a sign language action having the same meaning as a posterior word thereof, based on the extracted sign language action data;

an interference determination unit that determines that interference is generated between the parts of the robot used when the robot performs a sign language, if a distance between the parts on each of the created traces is not within a prescribed allowable range;

an action connection unit that connects sign language actions for words via the traces created in accordance with the inputted word strings such that no interference is generated between the parts of the robot; and an action adjustment unit that, if the interference is determined to be generated between any of the parts of the robot on the trace created for a pair of words, adjusts a position coordinate or a velocity as a sign language action for the pair of words so as to keep the position coordinate or the velocity within an allowable range as well as within a prescribed threshold range which is previously set such that meanings of both the prior word and the posterior word of the pair of words as the sign language action can be maintained.

2. The sign language action generating device according to claim 1, wherein the action adjustment unit adjusts a position coordinate or a velocity using, as the prescribed threshold range, a threshold range of a shift amount of a prescribed position coordinate or a prescribed velocity, or a threshold range of an evaluation function calculated based on the shift amount.

3. The sign language action generating device according to claim 2, wherein the action adjustment unit comprises an end point coordinate setting unit that, if interference is generated in the pair of words, adjusts a shift amount of a position coordinate of an end point of a sign language action having the same meaning as the prior word of the pair of words, or an evaluation function calculated based on the shift amount, within a prescribed threshold range.

4. The sign language action generating device according to claim 3, wherein the action adjustment unit further comprises a via point setting unit that, if the interference is still generated in the pair of words in spite of the shift of the position coordinate of the end point by the end point coordinate setting unit, cancels the shift of the position coordinate of the end point, defaults the position coordinate, and adjusts a shift amount of a position coordinate of a via point which is intervened between an end point of the prior word and a start point of the posterior word of the pair of words, or an evaluation function calculated based on the shift amount, within a prescribed threshold range.

5. The sign language action generating device according to claim 4,
wherein the action adjustment unit further comprises a timing change unit that, if the interference is still generated in the pair of words in spite of the shift of the position coordinate of the via point by the via point setting unit, cancels the shift of the position coordinate of the via point, defaults the position coordinate, and adjusts a shift amount of a velocity of a sign language action having the same meaning as the posterior word of the pair of words, or an evaluation function calculated based on the shift amount, within a prescribed threshold range.

6. The sign language action generating device according to claim 3,
wherein the end point coordinate setting unit shifts the position coordinate of the end point of the sign language action having the same meaning as the prior word of the pair of words, such that a calculation result with respect to the prior word using a prescribed evaluation function regarding to which degree a word in a sign language action can be understood falls within a prescribed range within which the meaning of the prior word of the pair of words can be maintained.

7. The sign language action generating device according to claim 4,
wherein the via point setting unit shifts the position coordinate of the via point, such that a calculation result with respect to the pair of words using a prescribed evaluation function regarding to which degree a word in a sign language action can be understood falls within a prescribed range in which the meanings of the prior word and the posterior word of the pair of words can be maintained.

8. The sign language action generating device according to claim 5,
wherein the timing change unit changes the velocity of the sign language action having the same meaning as the posterior word of the pair of words, such that a calculation result with respect to the posterior word using a prescribed evaluation function regarding to which degree a word in a sign language action can be understood falls within a prescribed range within which the meaning of the posterior word of the pair of words can be maintained.

9. A communication robot comprising: a body; a head; two arms; two legs; and a controller, each of the head, the two arms, the two legs, and the controller being connected to the body,
wherein the controller comprises:
a sign language action generating device which creates a sign language action for each word string by connecting skin language actions for each word used in a skin language performed by a robot, the robot including, as parts thereof, a body, a head, two arms, two legs, and a controller, each of the latter four parts being connected to the body, the sign language action generating device comprising:
a storage unit that stores therein a sign language word database in which a sign language action data which is previously created such that, in units of words, no interference is generated between the parts of the robot used for performing a skin language, the skin language action data being stored in association with a word having the same meaning as a sign language action corresponding thereto;
a word string input unit into which a word string is inputted;
a trace creation unit that extracts, from the sign language word database, a data on a sign language action for each pair of words which is constituted by two successive words in the word string inputted into the word string input unit, and creates, for the each pair of words, a trace which connects between an end point position of a sign language action having the same meaning as a prior word of the pair of words and a start point position of a sign language action having the same meaning as a posterior word thereof, based on the extracted skin language action data;
an interference determination unit that determines that interference is generated between the parts of the robot used when the robot performs a sign language, if a distance between the parts on each of the created traces is not within a prescribed allowable range;
an action connection unit that connects sign language actions for words via the traces created in accordance with the inputted word strings such that no interference is generated between the parts of the robot; and
an action adjustment unit that, if the interference is determined to be generated between any of the parts of the robot on the trace created for a pair of words, adjusts a position coordinate or a velocity as a sign language action for the pair of words so as to keep the position coordinate or the velocity within an allowable range as well as within a prescribed threshold range which is previously set such that meanings of both the prior word and the posterior word of the pair of words as the skin language action can be maintained;
an action determination unit that determines a sign language action to be expressed and inputs a word string representing the determined sign language action, into the sign language action generating device; and
an action execution unit that executes the sign language action having the same meaning as the inputted word string, based on the sign language action for each word string generated by the sign language action generating device.

10. The communication robot according to claim 9, wherein the action adjustment unit adjusts a position coordinate or a velocity using, as the prescribed threshold range, a threshold range of a shift amount of a prescribed position coordinate or a prescribed velocity, or a threshold range of an evaluation function calculated based on the shift amount.

11. The communication robot according to claim 10, wherein the action adjustment unit comprises an end point coordinate setting unit that, if interference is generated in the pair of words, adjusts a shift amount of a position coordinate of an end point of a sign language action having the same meaning as the prior word of the pair of words, or an evaluation function calculated based on the shift amount, within a prescribed threshold range.

12. The communication robot according to claim 11, wherein the action adjustment unit further comprises a via point setting unit that, if the interference is still generated in the pair of words in spite of the shift of the position coordinate of the end point by the end point coordinate setting unit, cancels the shift of the position coordinate of the end point, defaults the position coordinate, and adjusts a shift amount of a position coordinate of a via point which is intervened between an end point of the prior word and a start point of the posterior word of the pair of words, or an evaluation function calculated based on the shift amount, within a prescribed threshold range.

13. The communication robot according to claim 12, wherein the action adjustment unit further comprises a timing change unit that, if the interference is still generated in the pair of words in spite of the shift of the position coordinate of the via point by the via point setting unit, cancels the shift of the position coordinate of the via point, defaults the position coordinate, and adjusts a shift amount of a velocity of a sign language action having the same meaning as the posterior word of the pair of words, or an evaluation function calculated based on the shift amount, within a prescribed threshold range.

14. The communication robot according to claim 11, wherein the end point coordinate setting unit shifts the position coordinate of the end point of the sign language action having the same meaning as the prior word of the pair of words, such that a calculation result with respect to the prior word using a prescribed evaluation function regarding to which degree a word in a sign language action can be understood falls within a prescribed range within which the meaning of the prior word of the pair of words can be maintained.

15. The communication robot according to claim 12, wherein the via point setting unit shifts the position coordinate of the via point, such that a calculation result with respect to the pair of words using a prescribed evaluation function regarding to which degree a word in a sign language action can be understood falls within a prescribed range in which the meanings of the prior word and the posterior word of the pair of words can be maintained.

16. The communication robot according to claim 13, wherein the timing change unit changes the velocity of the sign language action having the same meaning as the posterior word of the pair of words, such that a calculation result with respect to the posterior word using a prescribed evaluation function regarding to which degree a word in a sign language action can be understood falls within a prescribed range within which the meaning of the posterior word of the pair of words can be maintained.

\* \* \* \* \*